United States Patent
Okada et al.

(10) Patent No.: US 8,243,159 B2
(45) Date of Patent: Aug. 14, 2012

(54) IMAGE CAPTURING DEVICE, IMAGE PROCESSING DEVICE, IMAGE ANALYSIS METHOD FOR THE IMAGE CAPTURING DEVICE AND THE IMAGE PROCESSING DEVICE, AND PROGRAM FOR FACIAL ATTRIBUTE DETECTION

(75) Inventors: Miyuki Okada, Kanagawa (JP); Kentarou Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 632 days.

(21) Appl. No.: 12/391,361

(22) Filed: Feb. 24, 2009

(65) Prior Publication Data

US 2009/0256926 A1    Oct. 15, 2009

(30) Foreign Application Priority Data

Apr. 9, 2008 (JP) .................................. 2008-101947

(51) Int. Cl.
*H04N 5/228* (2006.01)
*G06K 9/62* (2006.01)

(52) U.S. Cl. ..................................... 348/222.1; 382/216

(58) Field of Classification Search ................ 348/222.1; 382/209, 216, 218–219, 227
See application file for complete search history.

(56) References Cited

U.S. PATENT DOCUMENTS

2005/0207649 A1 * 9/2005 Enomoto et al. .............. 382/190
2006/0285750 A1   12/2006 Okada et al.
2007/0110321 A1 * 5/2007 Okada et al. .................. 382/209

FOREIGN PATENT DOCUMENTS

| JP | 5-174149 | 7/1993 |
|---|---|---|
| JP | 2001-92429 | 4/2001 |
| JP | 2004-46591 | 2/2004 |
| JP | 2007-4313 | 1/2007 |
| JP | 2007-226643 | 9/2007 |

OTHER PUBLICATIONS

U.S. Appl. No. 12/541,477, filed Aug. 14, 2009, Okada.

* cited by examiner

*Primary Examiner* — Kelly L Jerabek
(74) *Attorney, Agent, or Firm* — Oblon, Spivak, McClelland, Maier & Neustadt, L.L.P.

(57) ABSTRACT

An image capturing device includes: an image capturing unit that captures a subject and generates a captured image; a resolution converting unit that converts the captured image into a plurality of images with different resolutions; an image storing unit that stores the converted plurality of images with different resolutions as a set of images; a first image analysis processing unit that performs a first image analysis process of analyzing the captured image by using a combination of a plurality of images among the images included in the set of images; and a second image analysis processing unit that performs a second image analysis process that is different from the first image analysis process and is a process of analyzing the captured image by using, among the images included in the set of images, a combination of a plurality of images different from the combination of a plurality of images.

13 Claims, 17 Drawing Sheets

IMAGE CAPTURING DEVICE, IMAGE PROCESSING DEVICE, IMAGE ANALYSIS METHOD FOR THE IMAGE CAPTURING DEVICE AND THE IMAGE PROCESSING DEVICE, AND PROGRAM FOR FACIAL ATTRIBUTE DETECTION

BACKGROUND OF THE INVENTION

1. Field of the Invention

The present invention relates to an image capturing device. More specifically, the present invention relates to an image capturing device and an image processing device which perform a plurality of image analysis processes, an image analysis method for the image capturing device and the image processing device, and a program for causing a computer to execute the method.

2. Description of the Related Art

In the related art, image capturing devices such as a digital still camera and a digital video camera which capture a subject such as a person and record the captured image have come into widespread use. Also, in recent years, image analysis techniques for automatically recognizing a subject contained in a captured image are receiving attention. In particular, there have been proposed numerous face detection methods for detecting a person's face from a captured image. For example, an image capturing device has been proposed which cuts out a part of a captured image, compares the cut-out image against a template to compute the likelihood of the cut-out image being a person's face, and detects a face on the basis of this likelihood (see, for example, Japanese Unexamined Patent Application Publication No. 2007-4313 (FIG. 1)).

Also, in recent years, there have been proposed face attribute detection methods for detecting the attributes of a detected face. Methods exist in which, for example, the age group, sex, and the like of a person are detected as such face attributes. Also, for example, an image evaluation device has been proposed which evaluates the expression and the like of a detected face (see, for example, Japanese Unexamined Patent Application Publication No. 2004-46591 (FIG. 2)).

SUMMARY OF THE INVENTION

According to the related art described above, two image analysis processes are performed on a single captured image, including a face detection process of detecting a person's face from the captured image, and a face attribute detection process of detecting the attributes of the detected face, and these analysis results can be used.

In this regard, for example, when performing image analysis processes such as a face detection process and a face attribute detection process, it is necessary to convert a captured image into a plurality of resolutions in accordance with each process. However, the necessary image resolution often differs from process to process. For example, in the case of a face detection process, it is often possible to detect a human face even with an image having a relatively low resolution. In contrast, in the case of a face attribute detection process, to detect the facial expression, sex, age range, and the like, an image having a high resolution relative to the resolution of an image used for the face detection process often becomes necessary.

In this way, when performing a plurality of image analysis processes, it is necessary to separately prepare images with a plurality of resolutions in accordance with each process. Therefore, a processing time for the resolution conversion becomes necessary in each image analysis process, which may lead to a decrease in the processing speed of each image analysis process.

It is desirable to increase the processing speed of a plurality of image analysis processes.

According to an embodiment of the present invention, there is provided an image capturing device, an image analysis method for the image capturing device, and a program for causing a computer to execute the method. The image capturing device includes: an image capturing unit that captures a subject and generates a captured image; a resolution converting unit that converts the captured image into a plurality of images with different resolutions; an image storing unit that stores the converted plurality of images with different resolutions as a set of images; a first image analysis processing unit that performs a first image analysis process that is a process of analyzing the captured image by using a combination of a plurality of images among the images included in the set of images; and a second image analysis processing unit that performs a second image analysis process different from the first image analysis process, the second image analysis process being a process of analyzing the captured image by using, among the images included in the set of images, a combination of a plurality of images different from the combination of a plurality of images. Therefore, the captured image is converted into a plurality of images with different resolutions, the converted plurality of images with different resolutions are stored as a set of images, a first image analysis process is performed by using a combination of a plurality of images among the images included in the set of images, and a second image analysis process is performed by using, among the images included in the set of images, a combination of a plurality of images different from the above-mentioned combination of a plurality of images.

The above-mentioned embodiment may be configured such that the image capturing unit sequentially generates the captured image at a predetermined frame rate, the image storing unit includes a plurality of banks that serve as units in which the set of images are written or read, the image capturing device further includes a control unit that performs a control of sequentially writing the set of images to each of the plurality of banks with respect to each the captured image, the first image analysis processing unit performs the first image analysis process by using images included in a set of images that is stored in, among the plurality of banks, a bank that is written to immediately before starting the first image analysis process with respect to each the captured image, and the second image analysis processing unit performs the second image analysis process by using images included in a set of images that is stored in, among the plurality of banks, a bank that is written to immediately before starting the second image analysis process with respect to each the captured image. Therefore, the captured image is generated at a predetermined frame rate, the set of images is written to each of the plurality of banks with respect to each the captured image, the first image analysis process is performed by using images included in a set of images that is stored in, among the plurality of banks, a bank that is written to immediately before starting the first image analysis process with respect to each the captured image, and the second image analysis process is performed by using images included in a set of images that is stored in, among the plurality of banks, a bank that is written to immediately before starting the second image analysis process with respect to each the captured image.

The above-mentioned embodiment may be configured such that the image storing unit includes, for each of the banks, a write inhibit flag for setting write inhibition to the bank, the first image analysis processing unit sets write inhibition in the write inhibit flag corresponding to the bank in which the images being used for the first image analysis process are stored, and the control unit performs a control of sequentially writing the set of images to each of the plurality of banks in accordance with a predetermined sequence with respect to each the captured image, and if write inhibition is set in the write inhibit flag corresponding to the bank to be written to, the control unit performs a control of writing the set of images to the next bank in the predetermined sequence that follows the bank to be written to. Therefore, write inhibition is set in the write inhibit flag corresponding to the bank in which the images being used for the first image analysis process are stored, the set of images is written to each of the plurality of banks in accordance with a predetermined sequence with respect to each the captured image, and if write inhibition is set in the write inhibit flag corresponding to the bank to be written to, the set of images is written to the next bank in the predetermined sequence that follows the bank to be written to.

The above-mentioned embodiment may be configured such that the first image analysis processing unit performs as the first image analysis process an object detection process of detecting an object contained in the captured image, and the second image analysis processing unit performs as the second image analysis process an object attribute detection process of detecting attributes of the detected object. Therefore, an object contained in the captured image is detected, and attributes of the detected object are detected.

The above-mentioned embodiment may be configured such that at least one of images used in the object detection process is an image that is lower in resolution than images used in the object attribute detection process. Therefore, the object detection process is performed by setting at least one of images used in the object detection process to be an image that is lower in resolution than images used in the object attribute detection process.

The above-mentioned embodiment may be configured such that the image capturing device further includes a specific-object identifying unit that performs a specific-object identifying process of identifying whether or not the detected object is a specific object by using, among the images included in the set of images, a combination of a plurality of images which is different from a combination of images used in the object detection process and a combination of images used in the object attribute detection process, and at least one of the images used in the object attribute detection process is an image that is lower in resolution than the images used in the specific-object identifying process. Therefore, whether or not the detected object is a specific object is identified by using, among the images included in the set of images, a combination of a plurality of images which is different from a combination of images used in the object detection process and a combination of images used in the object attribute detection process, and the object attribute detection process is performed by setting at least one of the images used in the object attribute detection process to be an image that is lower in resolution than the images used in the specific-object identifying process.

The above-mentioned embodiment may be configured such that the object is a face of a person. Therefore, a face of a person contained in the captured image is detected, and attributes of the detected face of a person are detected.

The above-mentioned embodiment may be configured such that the first image analysis processing unit performs as the first image analysis process an object detection process of detecting an object contained in the captured image, and the second image analysis processing unit performs as the second image analysis process a specific-object identifying process of identifying whether or not the detected object is a specific object. Therefore, an object contained in the captured image is detected, and whether or not the detected object is a specific object is identified.

According to an embodiment of the present invention, there is provided an image processing device, an image analysis method for the image processing device, and a program for causing a computer to execute the method. The image processing device includes: an image input unit that inputs an image; a resolution converting unit that converts the inputted image into a plurality of images with different resolutions; an image storing unit that stores the converted plurality of images with different resolutions as a set of images; a first image analysis processing unit that performs a first image analysis process of analyzing the inputted image by using a combination of a plurality of images among the images included in the set of images; and a second image analysis processing unit that performs a second image analysis process different from the first image analysis process, the second image analysis process being a process of analyzing the inputted image by using, among the images included in the set of images, a combination of a plurality of images different from the combination of a plurality of images. Therefore, the inputted image is converted into a plurality of images with different resolutions, the converted plurality of images with different resolutions are stored as a set of images, a first image analysis process is performed by using a combination of a plurality of images among the images included in the set of images, and a second image analysis process is performed by using, among the images included in the set of images, a combination of a plurality of images different from the above-mentioned combination of a plurality of images.

DESCRIPTION OF THE PREFERRED EMBODIMENTS

Next, an embodiment of the present invention will be described in detail with reference to the drawings.

Figure 1:
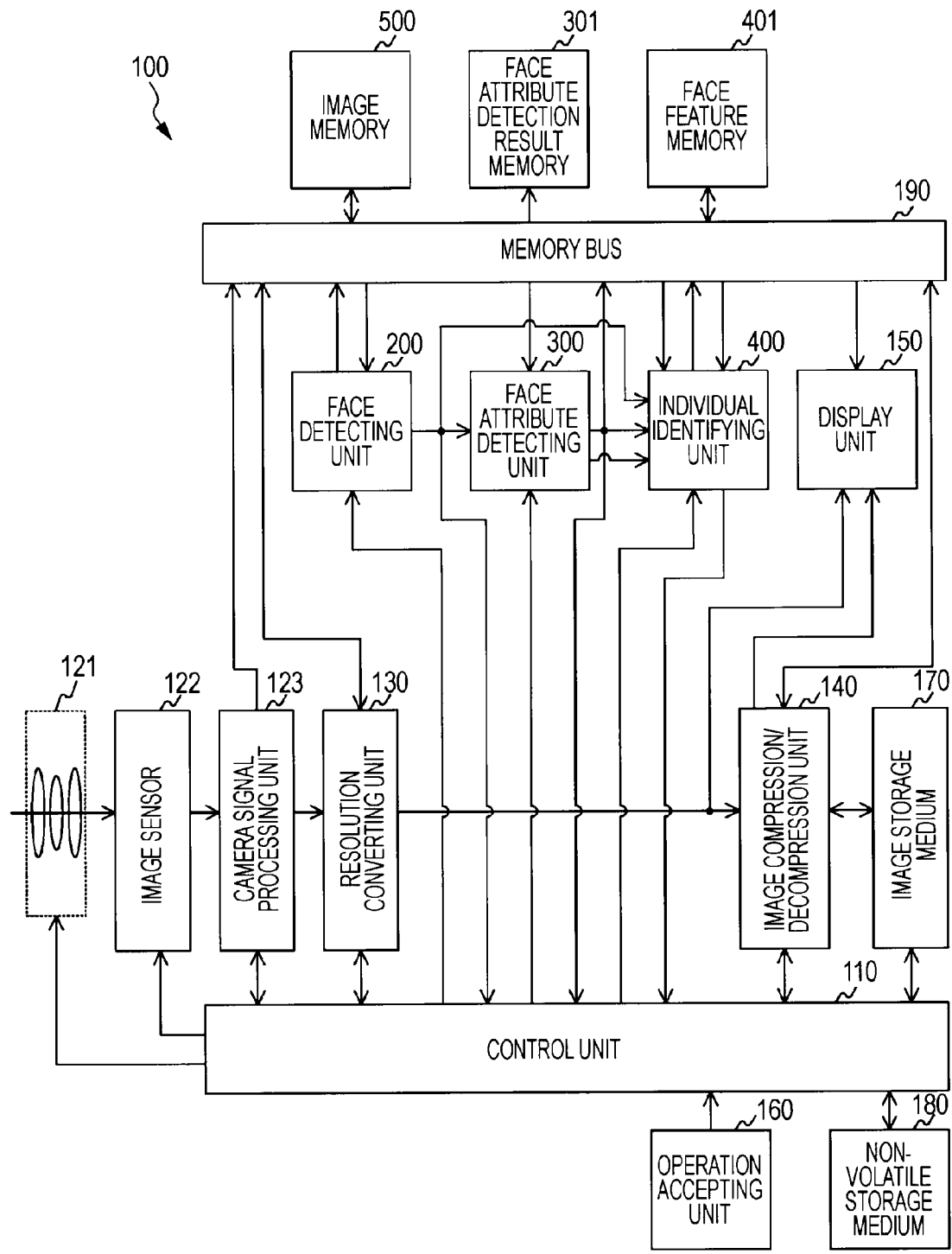
FIG. 1 is a block diagram showing a functional configuration example of an image capturing device according to an embodiment of the present invention.

FIG. 1 is a block diagram showing a functional configuration example of an image capturing device 100 according to an embodiment of the present invention. The image capturing device 100 includes a control unit 110, a lens group 121, an image sensor 122, a camera signal processing unit 123, a resolution converting unit 130, an image compression/decompression unit 140, a display unit 150, an operation accepting unit 160, an image storage medium 170, a non-volatile storage medium 180, a memory bus 190, a face detecting unit 200, a face attribute detecting unit 300, a face attribute detection result memory 301, an individual-identifying unit 400, a face feature memory 401, and an image memory 500. Transmission and reception of an image signal between individual blocks of the image capturing device 100 are done through direct exchange, or through exchange via the image memory 500 that is a shared memory and the memory bus 190. Examples of the image capturing device 100 include an image capturing device such as a digital still camera or a digital video camera, and an image capturing device such as a camera attached to a terminal device such as a mobile telephone or a personal computer.

The control unit 110 controls the individual units in the image capturing device 100 on the basis of various control programs stored in a memory (not shown). The control unit 110 can be realized by, for example, a CPU (Central Processing Unit).

The lens group 121 includes a plurality of lenses such as a focus lens and a zoom lens. Incident light from a subject inputted via these lenses is supplied to the image sensor 122. Aperture control and focus control in the lens group 121 are performed by the control unit 110.

The image sensor 122 converts the incident light from the subject that has passed through the lens group 121 into an electrical signal by photoelectric conversion, and supplies the electrical signal obtained by the photoelectric conversion to the camera signal processing unit 123. As the image sensor 122, an image capturing element such as a CCD (Charge Coupled Device) sensor or a CMOS (Complementary Metal Oxide Semiconductor) sensor can be used.

The camera signal processing unit 123 applies various kinds of signal processing to the electrical signal outputted from the image sensor 122, and outputs image data that has undergone signal processing to the resolution converting unit 130 as a captured image. Also, the image data that has undergone signal processing is supplied to the image compression/decompression unit 140 and the display unit 150 via the image memory 500 and the memory bus 190. Examples of signal processing in the camera signal processing unit 123 include white balance adjustment, noise reduction, level correction, A/D conversion, and color correction. The image sensor 122 and the camera signal processing unit 123 represent an example of an image capturing unit and an image input unit described in the claims.

The resolution converting unit 130 converts the captured image outputted from the camera signal processing unit 123 into images with a plurality of resolutions, and stores the converted images with a plurality of resolutions sequentially into the image memory 500 via the memory bus 190. The resolution conversion and the storage of the converted images mentioned above will be described later in detail with reference to FIG. 7.

The image compression/decompression unit 140 compresses or decompresses various kinds of inputted image data in accordance with each image processing. For example, image data that has been compressed by the image compression/decompression unit 140 is outputted for recording onto the image storage medium 170. Also, image data that has been decompressed by the image compression/decompression unit 140 is outputted to the display unit 150 and the image memory 500. As the compression scheme, for example, the JPEG (Joint Photographic Experts Group) scheme can be adopted.

The display unit 150 displays an image corresponding to image data outputted from the camera signal processing unit 123 or the image compression/decompression unit 140.

The operation accepting unit 160 accepts various operations made by the user, and outputs information on the accepted operation to the control unit 110. The display unit 150 and the operation accepting unit 160 may be configured integrally as a touch panel, or may be configured separately, with the display unit 150 configured as a liquid crystal display (LCD) and the operation accepting unit 160 configured as a hard key such as a cross key.

The image storage medium 170 stores image data outputted from the image compression/decompression unit 140. Also, the image storage medium 170 supplies the stored image data to the image compression/decompression unit 140. As the image storage medium 170, for example, an image storage medium such as a magnetic disc, an optical disc, a semiconductor storage medium, or a magnetic tape can be used. Also, the image recording medium 170 can be configured as an external removable recording medium or as a built-in recording medium.

The non-volatile storage medium 180 stores various kinds of information. A volatile storage medium may be used instead of a non-volatile storage medium.

The memory bus 190 is a shared bus for transmitting image data.

The face detecting unit 200 detects a human face contained in a captured image, by using the images with a plurality of resolutions stored in the image memory 500. Then, the face detecting unit 200 outputs face detection results as information related to the detected face to the control unit 110, the face attribute detecting unit 300, and the individual-identifying unit 400. The face detecting unit 200 will be described later in detail with reference to FIG. 2. The face detecting unit 200 represents an example of a first image analysis processing unit described in the claims.

The face attribute detecting unit 300 detects the attributes of the face detected by the face detecting unit 200, on the basis of the face detection results outputted from the face detecting unit 200, by using the images with a plurality of resolutions stored in the image memory 500. Then, the face attribute detecting unit 300 outputs the face attribute detection results as information related to the detected face attributes to the control unit 110, the face attribute detection result memory 301, and the individual-identifying unit 400. The face attribute detecting unit 300 will be described later in detail with reference to FIG. 3. The face attribute detecting unit 300 represents an example of a second image analysis processing unit described in the claims.

The face attribute detection result memory 301 stores the face attribute detection results outputted from the face attribute detecting unit 300.

The individual-identifying unit 400 determines, on the basis of the face detection results outputted from the face detecting unit 200, whether or not the face detected by the face detecting unit 200 is the face of the same person as a registered person by using the images with a plurality of resolutions stored in the image memory 500. This registered person is a person whose face features are stored in the face feature memory 401. Then, the individual-identifying unit 400 outputs determination results to the control unit 110. The individual-identifying unit 400 and the face feature memory 401 will be described later in detail with reference to FIG. 14. The individual-identifying unit 400 represents an example of the second image analysis processing unit and a specific-object identifying unit described in the claims.

The image memory 500 stores image data to be processed by the image capturing device 100. The face attribute detecting result memory 301, the face feature memory 401, and the image memory 500 can be each realized by, for example, a RAM (Random Access Memory). Also, the image memory 500 represents an example of an image storage unit described in the claims.

Now, a description will be given of an example in which a correlation process (similarity calculation based on template matching) is performed in each of the processes in the face detecting unit 200, the face attribute detecting unit 300, and the individual-identifying unit 400.

Image data outputted from the image compression/decompression unit 140 may be outputted for storage into an external device such as an external storage medium on the basis of control by the control unit 110. Also, the image capturing device 100 may be provided with an input/output terminal, and this input/output terminal and an external device may be connected to each other so that image data inputted from this external device is inputted to the image compression/decompression unit 140.

Figure 2:
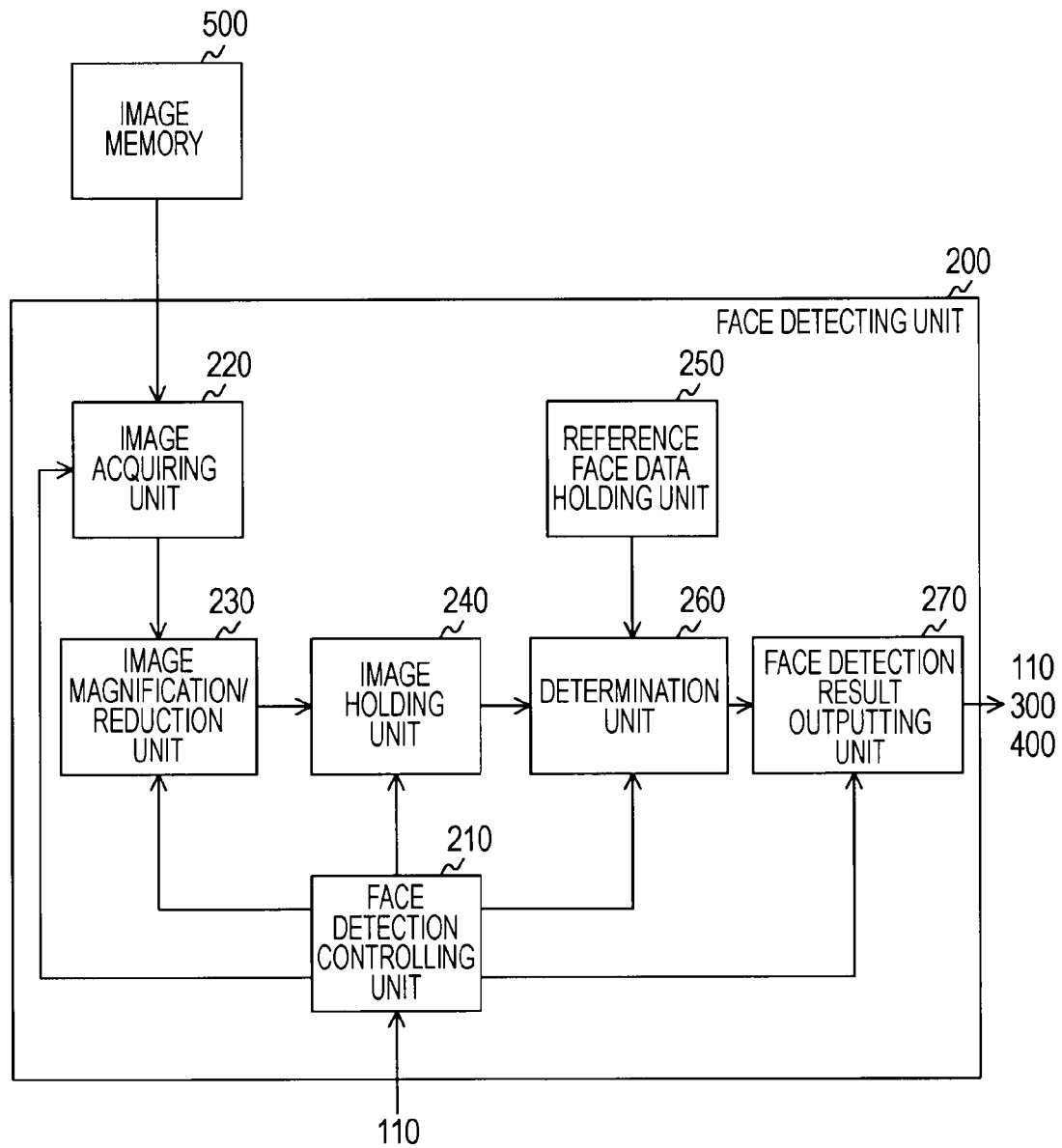
FIG. 2 is a block diagram showing a functional configuration example of a face detecting unit according to an embodiment of the present invention.

FIG. 2 is a block diagram showing a functional configuration example of the face detecting unit 200 according to an embodiment of the present invention. FIG. 2 shows, in addition to the functional configuration example of the face detecting unit 200, the schematic relationship between the face detecting unit 200 and the image memory 500. The face detecting unit 200 includes a face detection controlling unit 210, an image acquiring unit 220, an image magnification/reduction unit 230, an image holding unit 240, a reference face data holding unit 250, a determination unit 260, and a face detection result outputting unit 270.

The face detection controlling unit 210 controls individual units in the face detection unit 200 in accordance with an instruction from the control unit 110.

The image acquiring unit 220 acquires an image at a relatively low resolution from among the images with a plurality of resolutions stored in the image memory 500, on the basis of control by the face detection controlling unit 210, and outputs the acquired image to the image magnification/reduction unit 230. This image acquisition will be described later in detail with reference to FIG. 10.

The image magnification/reduction unit 230 performs a process of magnifying or reducing images outputted from the image acquiring unit 220, into images suitable for face detection on the basis of control by the face detection controlling unit 210. Then, the image magnification/reduction unit 230 supplies the images that have undergone the magnification or reduction process to the image holding unit 240. The image magnification ratio or reduction ratio is determined on the basis of an instruction from the control unit 110. This image magnification and reduction will be described later in detail with reference to FIG. 10.

The image holding unit 240 is an image memory that holds images that have undergone a magnification or reduction process by the image magnification/reduction unit 230, and supplies the held images to the determination unit 260.

The reference face data holding unit 250 holds face data that serves as a reference for face detection, and supplies the held face data to the determination unit 260. The face data that serves as a reference is, for example, a face image itself, a feature database related to human faces, or the like.

The determination unit 260 determines, on the basis of control by the face detection controlling unit 210, whether or not a face is contained in images held in the image holding unit 240, and outputs the determination results to the face detection result outputting unit 270. Specifically, the determination unit 260 picks out a part of an image held in the image holding unit 240 in a fixed window size, and performs a template matching process between the picked-out image and the face data held in the reference face data holding unit 250. Then, through this process, the determination unit 260 computes faceness on the basis of the level of correlation, and determines whether or not a face is contained in the picked-out image on the basis of the computed faceness. For example, if the computed faceness is sufficiently high, it is determined that a face is contained in the picked-out image. As such a determination is repeatedly executed, faces contained in images held in the image holding unit 240 are detected. In addition, on the basis of the level of correlation with face data held in the reference face data holding unit 250, the determination unit 260 extracts various kinds of data related to faces contained in images held in the image holding unit 240, and outputs the picked out various kinds of data as the determination results to the face detection result outputting unit 270.

The face detection result outputting unit 270 outputs the determination results outputted from the determination unit 260 to the control unit 110, the face attribute detecting unit 300, and the individual-identifying unit 400 as face detection results, on the basis of control by the face detection controlling unit 210. The face detection results include, for example, information such as an indication that a face has been detected, the coordinates of the face region (position of a face), the size of the face region, the orientation or angle of the face, and faceness. Such face detecting results are sequentially accumulated into the control unit 110.

Figure 3:
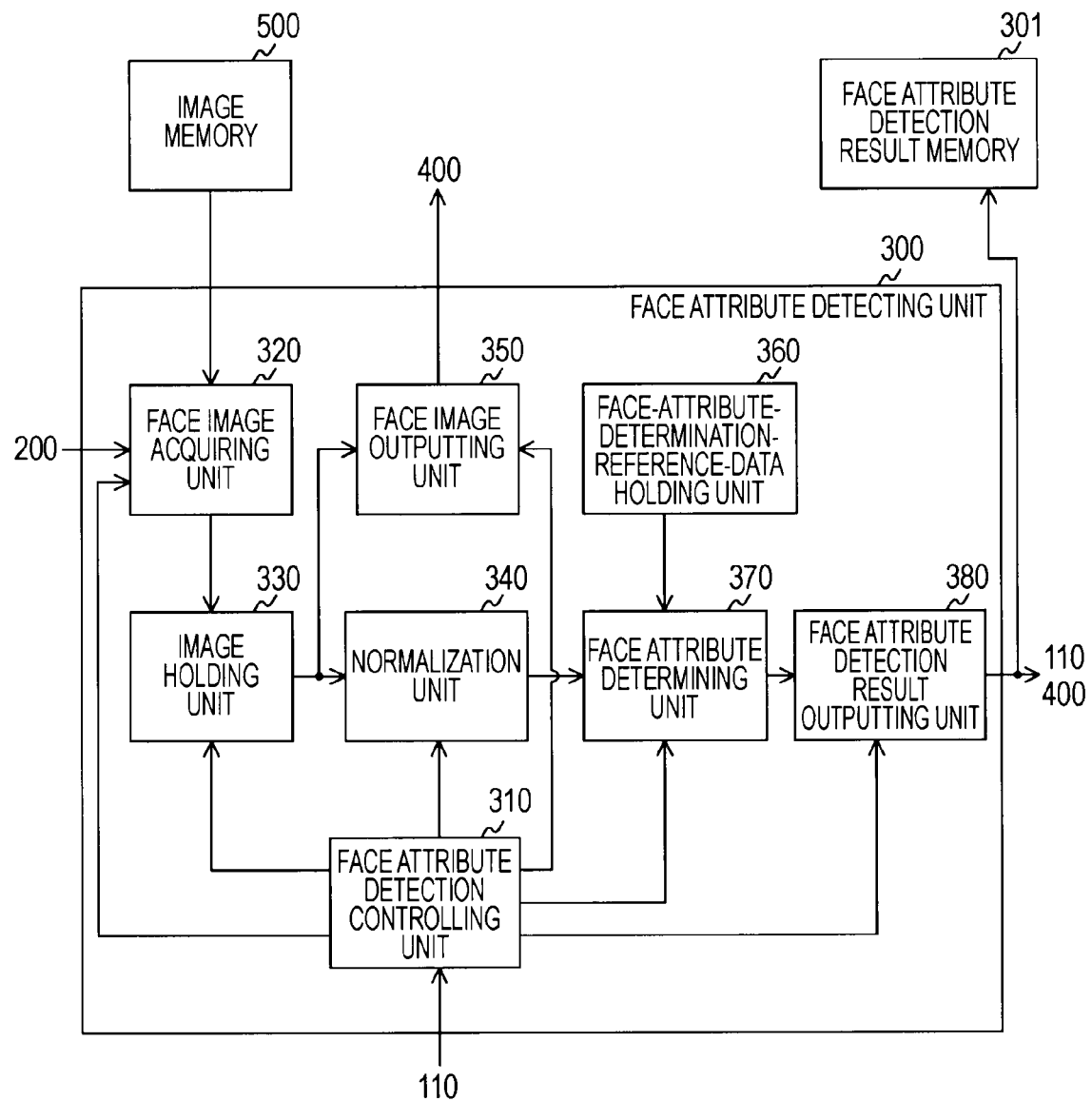
FIG. 3 is a block diagram showing a functional configuration example of a face attribute detecting unit according to an embodiment of the present invention.

FIG. 3 is a block diagram showing a functional configuration example of the face attribute detecting unit 300 according to an embodiment of the present invention. FIG. 3 shows, in addition to the functional configuration example of the face attribute detecting unit 300, the schematic relationship between the face attribute detecting unit 300, the face attribute detection result memory 301, and the image memory 500. The face attribute detecting unit 300 includes a face attribute detection controlling unit 310, a face image acquiring unit 320, an image holding unit 330, a normalization unit 340, a face image outputting unit 350, a face attribute determining unit 370, a face-attribute-determination-reference-data holding unit 360, and a face attribute detection result outputting unit 380.

The face attribute detection controlling unit 310 controls the individual units in the face attribute detecting unit 300 in accordance with an instruction from the control unit 110.

The face image acquiring unit 320 acquires the image of a face region (face image) from the image memory 500 in accordance with the coordinates and size of the face region contained in the face detection results outputted from the face detecting unit 200, on the basis of control by the face attribute detection controlling unit 310. The face image acquired by the face image acquiring unit 320 is the image of a face region contained in an image with an intermediate resolution among the images with a plurality of resolutions stored in the image memory 500. The thus acquired face image is held in the image holding unit 330. This face image acquisition will be described later in detail with reference to FIG. 10.

The image holding unit 330 holds a face image acquired by the face image acquiring unit 320, and supplies the held face image to the normalization unit 340 and the face image outputting unit 350.

The normalization unit 340 performs normalization on the face image held in the image holding unit 300, on the basis of control by the face attribute detection controlling unit 310, and outputs a normalized face image, which is a face image that has been normalized, to the face attribute determining unit 370. Specifically, the normalization unit 340 normalizes the size and tilt of a face so that both eyes of the face contained in the face image held in the image holding unit 330 are kept substantially horizontal, and that the face becomes a fixed size. Then, the normalization unit 340 converts the face image into a fixed resolution (for example, to about 40×40 pixels) to generate a normalized face image. In this way, by keeping both the eyes horizontal, and bringing both the eyes closer to fixed coordinates with the face set at a fixed size, the accuracy of face attribute detection and individual identification can be improved.

The face image outputting unit 350 accepts a face image supplied from the image holding unit 330, and outputs the face image to the individual-identifying unit 400, on the basis of control by the face attribute detection controlling unit 310. For example, a face image at a resolution commonly used in the face attribute detecting unit 300 and the individual-identifying unit 400 is outputted from the face image outputting unit 350 to the individual-identifying unit 400.

The face-attribute-determination-reference-data holding unit 360 holds, for each of face attributes, a face-attribute-determination dictionary made up of a plurality of pieces of face-attribute-determination reference data used for the determination by the face attribute determining unit 370. The face-attribute-determination reference data is reference data obtained after performing sufficient learning in advance for face attributes to be determined by the face attribute determining unit 370.

The face attribute determining unit 370 determines the attributes of a face contained in the normalized face image outputted from the normalization unit 340, by using the face-attribute-determination reference data held by the face-attribute-determination-reference-data holding unit 360, and outputs the face attribute determination results to the face attribute detection result outputting unit 380. For example, with respect to the normalized face image outputted from the normalization unit 340, the face attribute determining unit 370 computes to what extent the attribute determination reference data held in the face-attribute-determination-reference-data holding unit 360 is satisfied or not satisfied, thus obtaining an integrated value with respect to each attribute. Each face attribute is determined on the basis of this integrated value. Examples of the face attributes to be determined by the face attribute determining unit 370 include a facial expression, age or age range, sex, opening/closing of the eyes, race, the presence/absence and kind of eyeglasses, the presence/absence and kind of beard, the presence/absence and kind of a hat, the presence/absence and kind of accessories, hairstyle, orientation or angle of the face, and the positions of the eyes, mouth, eyebrows, and nose. A facial expression refers to, for example, a smiling face, a serious face, a sad face, or an angry face.

The face attribute detection result outputting unit 380 outputs the face attribute determination results outputted from the face attribute determining unit 370, to the control unit 110, the face attribute detection result memory 301, and the individual-identifying unit 400 as face attribute detection results on the basis of control by the face attribute detection controlling unit 310. These face attribute detection results are sequentially stored into the face attribute detection result memory 301.

Figure 4:
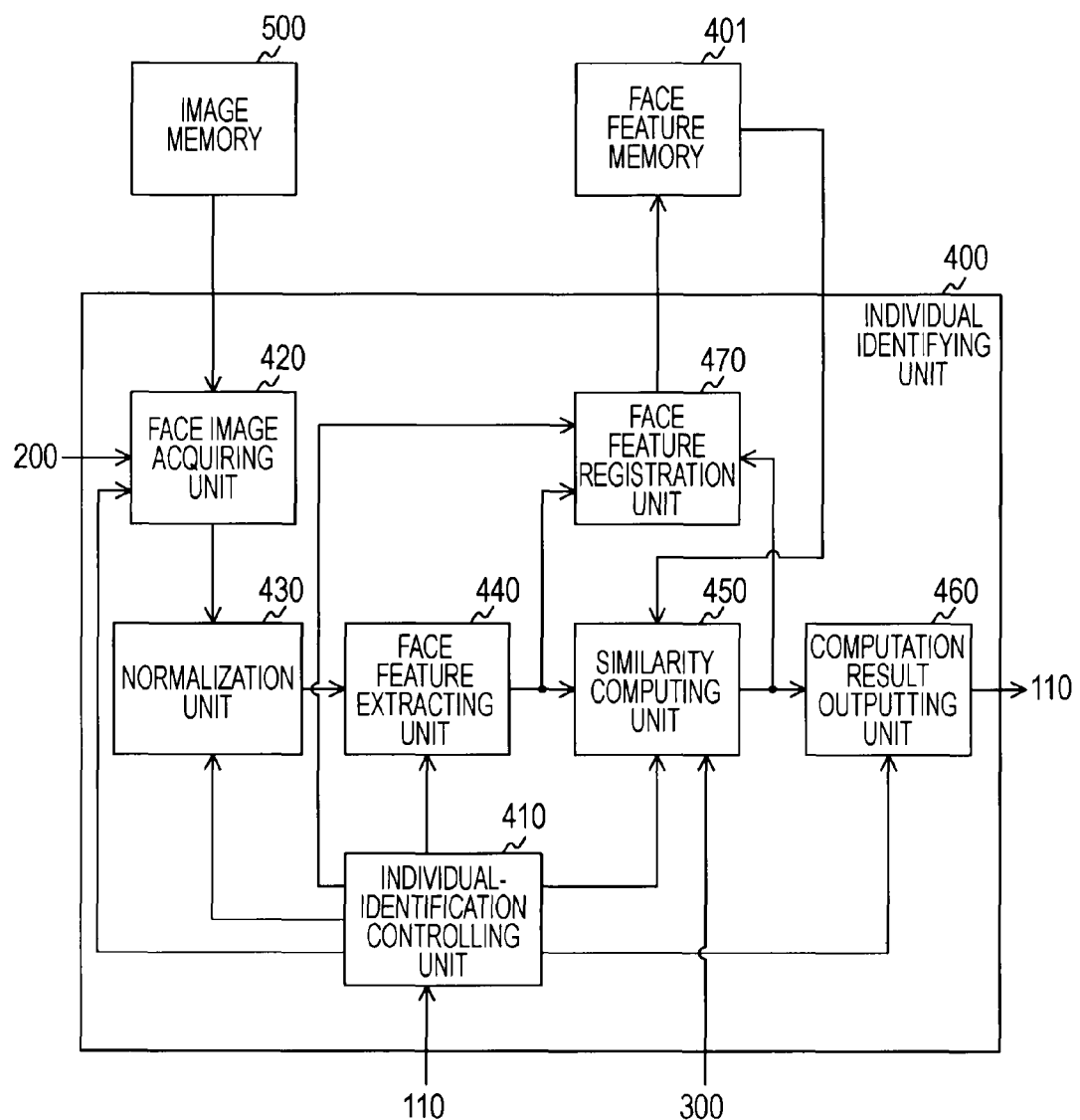
FIG. 4 is a block diagram showing a functional configuration example of an individual-identifying unit according to an embodiment of the present invention.

FIG. 4 is a block diagram showing a functional configuration example of the individual-identifying unit 400 according to an embodiment of the present invention. FIG. 4 shows, in addition to the functional configuration example of the individual-identifying unit 400, the schematic relationship between the face feature memory 401, and the image memory 500. The individual-identifying unit 400 includes an individual-identification controlling unit 410, a face image acquiring unit 420, a normalization unit 430, a face feature extracting unit 440, a similarity computing unit 450, a computation result acquiring unit 460, and a face feature registration unit 470. Also, the individual-identifying unit 400 acquires face features stored in the face feature memory 401 to perform similarity computation, and additionally registers a new face feature that satisfies fixed conditions into the face feature memory 401.

The individual-identification controlling unit 410 controls the individual units in the individual-identifying unit 400 in accordance with an instruction from the control unit 110.

The face image acquiring unit 420 acquires the image of a face region (face image) from the image memory 500 in accordance with the coordinates and size of a face region contained in the face detection results outputted from the face detecting unit 200, on the basis of control by the individual-identification controlling unit 410. The face image acquired by the face image acquiring unit 420 is the image of a face region contained in an image with a relatively high resolution among the images with a plurality of resolutions stored in the image memory 500. Then, the acquired face image is outputted to the normalization unit 430. In this connection, as for the face image at a resolution commonly used in the face attribute detecting unit 300 and the individual-identifying unit 400, the face image acquiring unit 420 may acquire the face image outputted from the face image outputting unit 350. This face image acquisition will be described later in detail with reference to FIG. 10.

The normalization unit 430 performs normalization on a face image outputted from the face image acquiring unit 420, on the basis of control by the individual-identification controlling unit 410, and outputs a normalized face image, which is a face image that has been normalized, to the face feature extracting unit 440. Since this normalization is the same as the normalization performed by the normalization unit 340 of the face attribute detecting unit 300 except that the face image is converted into a different resolution, a detail description thereof is omitted here. Generally speaking, to perform an individual-identifying process, a face image of a resolution higher than that in the face attribute detection process is necessary. Accordingly, in the individual-identifying process, a face image whose size and tilt have been normalized is converted into a relatively high fixed resolution (for example, about 60×60 pixels) to generate a normalized face image.

The face feature extracting unit 440 extracts face features from the normalized face image outputted from the normalization unit 430, on the basis of control by the individual-identification controlling unit 410, and outputs the extracted face features to the similarity computing unit 450 and the face feature registration unit 470. As the method for this face feature extraction, for example, an extraction method using a Gabor filter is commonly employed (see, for example, Japanese Unexamined Patent Application Publication No. 2006-4003). The face features extracted by using this Gabor filter are referred to as a Gabor jet.

The face feature memory 401 stores face features extracted with respect to the face of a specific person (character), and face attributes related to this specific person in association with each other for each person, and supplies the stored face features and face attributes to the similarity computing unit 450 via the memory bus 190. Also, the face feature memory 401 records face features outputted from the face feature registration unit 470 for each person by overwriting or addition.

The similarity computing unit 450 compares face features outputted from the face feature extracting unit 440 against one or a plurality of face features stored in the face feature memory 401 to compute a similaritiy between these face features, on the basis of control by the individual-identification controlling unit 410. The thus computed similarity is a value indicating the degree of matching between a face detected by the face detecting unit 200 and the face of the same person as a specific person whose face features are stored in the face feature memory 401. The similarity computing unit 450 outputs the computed similarity to the computation result outputting unit 460 and the face feature registration unit 470. In this regard, the similarity computing unit 450 may be configured to determine whether or not execution of face feature similarity computation is necessary, by using the face attribute detection results outputted from the face attribute detecting unit 300. That is, the similarity computing unit 450 compares the face attribute detection results outputted from the face attribute detecting unit 300 against the face attributes of a specific person outputted from the face feature extracting unit 440, and determines whether or not the face attribute detection results clearly disagree. If it is determined that the face attribute detection results clearly disagree, it is then determined at this point that the face detected by the face detecting unit 200 is not the face of the same person as a specific person, and the computation of a face feature similarity is discontinued. For example, if sex or age range (adult/child) as a face attribute disagrees, then it can be determined that the face in question is not the face of the same person as a specific person. This makes it possible to perform the similarity computation process faster.

The computation result outputting unit 460 outputs the similarity outputted from the similarity computation unit 450, to the control unit 110 as a determination result on individual identification, on the basis of control by the individual-identification controlling unit 410. Such a determination result on individual identification is sequentially accumulated into the control unit 110. The control unit 110 can identify a specific individual on the basis of the determination result on individual identification.

The control unit 110 executes camera control such as AF (Auto Focus), AE (Automatic Exposure), AWB (Auto White Balance), strobe control, auto zoom, skin color correction, and face marker display on the basis of the pieces of result data received from the face detecting unit 200, the face attribute detecting unit 300, and the individual-identifying unit 400. Also, the control unit 110 can record these pieces of result data into an external recording medium as data appended to a captured image, and output the appended data from the input/output terminal to an external device outside of the image capturing device 100. The control unit 110 may be also configured to supply the pieces of result data received from the face detecting unit 200, the face attribute detecting unit 300, and the individual-identifying unit 400 to other individual units for use by the other individual units.

The face feature registration unit 470 registers face features that satisfy fixed conditions into the face feature memory 401, among the face features outputted from the face feature extracting unit 440, on the basis of an instruction from the individual-identification controlling unit 410. That is, the registration process is executed when registration of the face features of a specific person is instructed by the user, or when it is determined that fixed face feature registration conditions are satisfied within the image capturing device 100. The fixed face feature registration conditions can be set as, for example, the following conditions (1) and (2).

(1) The similarity to a pre-registered face is extremely high.
(2) At least one of the followings (a) to (c) is satisfied.
  (a) The level of faceness at face detection is higher than that of a pre-registered face.
  (b) The level of front-facingness is higher than that of a pre-registered face.
  (c) A fixed period of time has elapsed since the previous registration.

By performing the registration process in this way, the latest face features can be held appropriately.

Figure 5A:
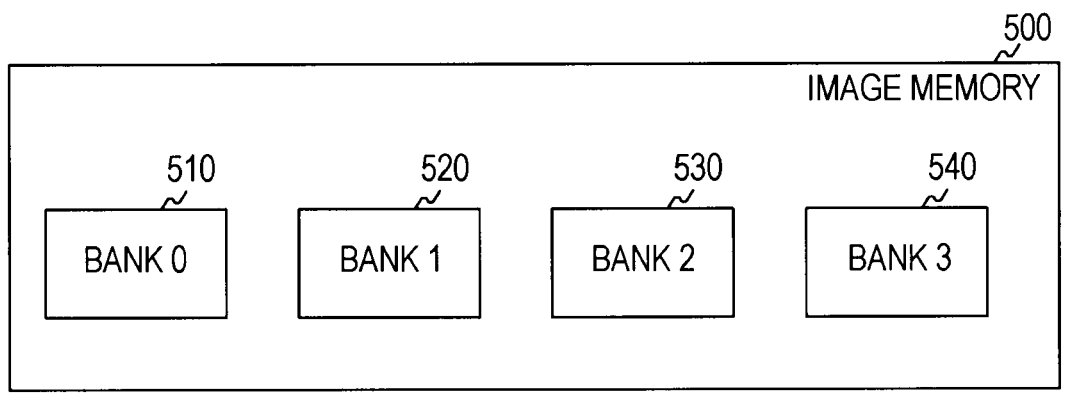
FIGS. 5A and 5B are diagrams schematically showing the contents of information stored in an image memory according to an embodiment of the present invention.
Figure 5B:
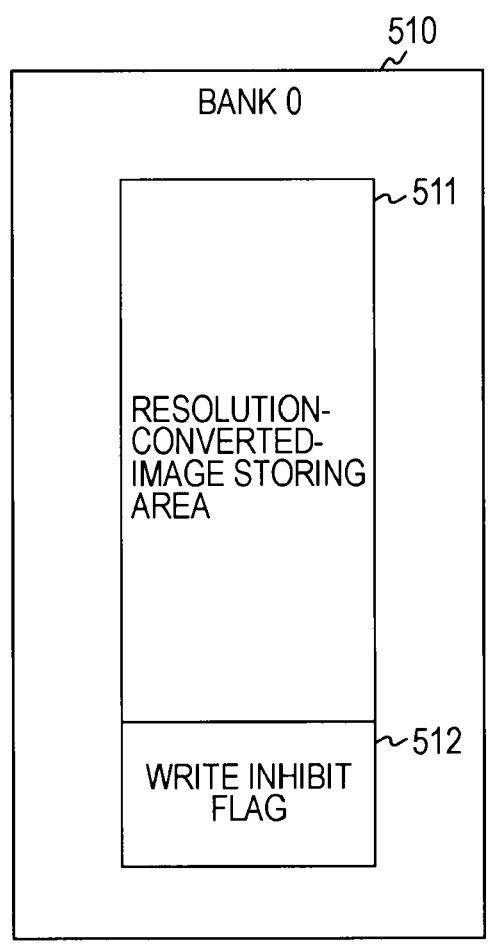

FIGS. 5A and 5B are diagrams schematically showing the contents of information stored in the image memory 500 according to an embodiment of the present invention. FIG. 5A shows Bank 0(510) through Bank 3(540) in the image memory 500, and FIG. 5B shows an example of the basic structure of Bank 0(510). A bank is a unit of management in which the image memory 500 is managed. The example shown in FIG. 5A is directed to a case in which four banks (Bank 0(510) through Bank 3(540)) are provided in the image memory 500. Since the respective basic structures of Bank 0(510) through Bank 3(540) are the same, FIG. 5B shows only Bank 0(510), and description of Bank 1(520) through Bank 3(540) is omitted.

As shown in FIG. 5B, Bank 0(510) includes a resolution-converted-image storing area 511 and a write inhibit flag 512.

The resolution-converted-image storing area 511 is an area for storing a plurality of images whose resolutions have been converted by the resolution converting unit 130. The method of storing the plurality of images will be described later in detail with reference to FIG. 7.

The write inhibit flag 512 is a flag that sets inhibition of writing to Bank 0(510). Specifically, "1" is recorded (flag ON) while a face detection process is performed by the face detecting unit 200 on images stored in the resolution-converted-image storing area 511. Also, "0" is recorded (flag OFF) while a face detection process is not performed by the face detecting unit 200 on images stored in the resolution-converted-image storing area 511. When "1" is recorded in the write inhibit flag 512, writing to Bank 0(510) is inhibited. This write inhibition will be described later in detail with reference to FIG. 11.

Figure 6A:
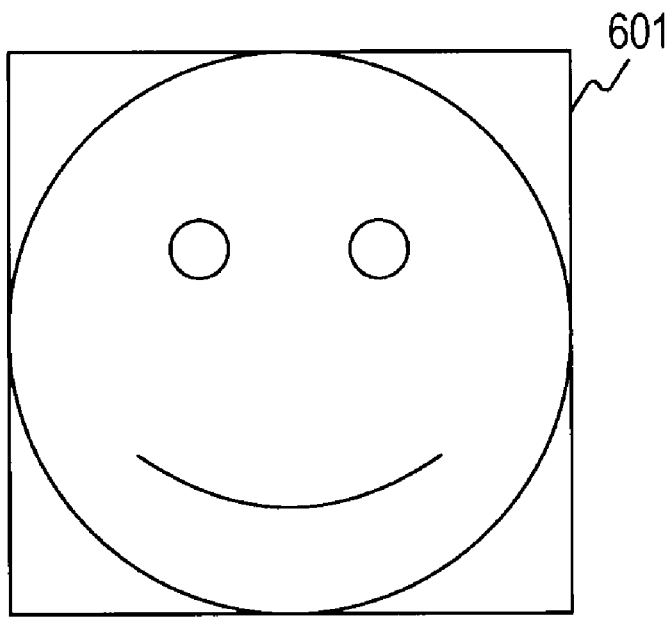
FIGS. 6A to 6C are diagrams schematically showing the face sizes of templates used in respective processes in the face detecting unit, the face attribute detecting unit, and the individual-identifying unit.
Figure 6B:
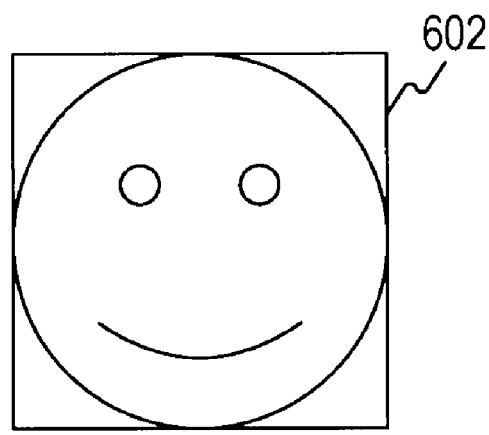
Figure 6C:
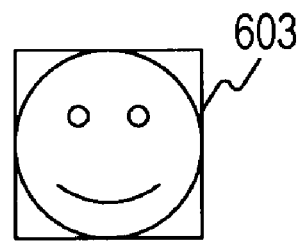

FIGS. 6A to 6C are diagrams schematically showing the face sizes of templates used in the respective processes in the face detecting unit 200, the face attribute detecting unit 300, and the individual-identifying unit 400. As described above, in the respective processes, a correlation process is performed by using images with a plurality of resolutions according to the respective processes. In this correlation process, templates of different sizes are used.

FIG. 6A shows the face size used in the individual-identifying process in the individual-identifying unit 400 (basic face size 601 for individual-identifying process), FIG. 6B shows the face size used in the face attribute detection process in the face attribute detecting unit 300 (basic face size 602 for face attribute detection process), and FIG. 6C shows the face size used in the face detection process in the face detecting unit 200 (basic face size 603 for face detection process). For example, in the face detection process, a human face can be recognized as a face even if the resolution of an image used for face detection is relatively low. In the face attribute detection process, it is often difficult to detect the facial expression, age range, or sex unless the resolution is somewhat higher than that used in the face detection process. Further, in the individual-identifying process, it is often difficult to identify a specific individual unless the resolution is higher than that used in the face attribute detection process. Accordingly, for example, if an image with a resolution of about 60×60 pixels is necessary as the face image used for the individual-identifying process in the individual-identifying unit 400, an image with a resolution of about 40×40 pixels is necessary as the face image used for the face attribute detection process in the face attribute detecting unit 300. Also, an image with a resolution of about 20×20 pixels is necessary as the face image used for the face detection process in the face detecting unit 200. Since the necessary resolution of an image varies according to each process, according to an embodiment of the present invention, as shown in FIG. 7, a plurality of images with different resolutions are stored in each bank with respect to a single captured image, and an images with a resolution appropriate to each process is used.

Figure 7:
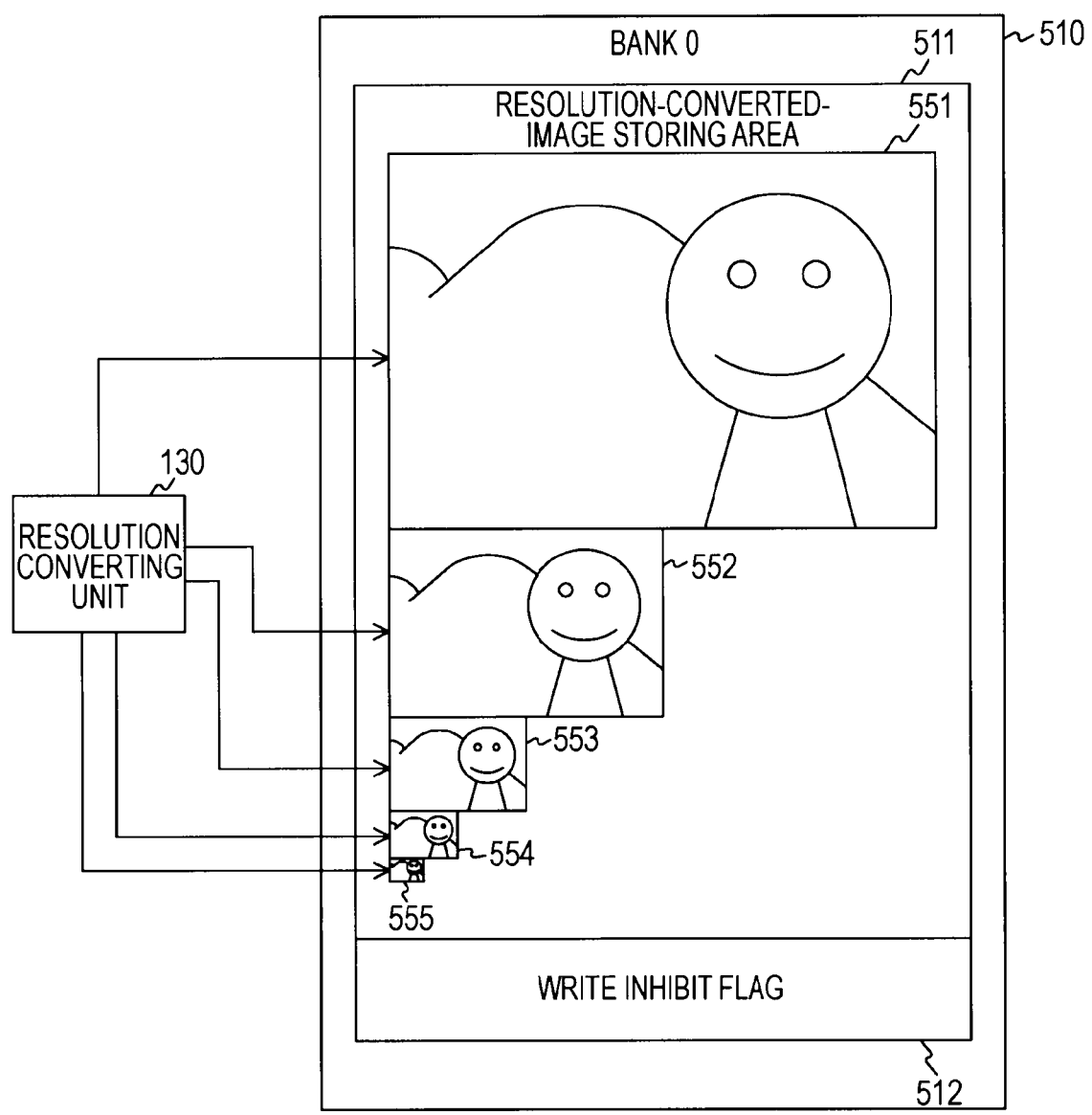
FIG. 7 is a diagram schematically showing a storage method used for storing images whose resolutions have been converted by a resolution converting unit into the image memory according to an embodiment of the present invention.
Figure 9:
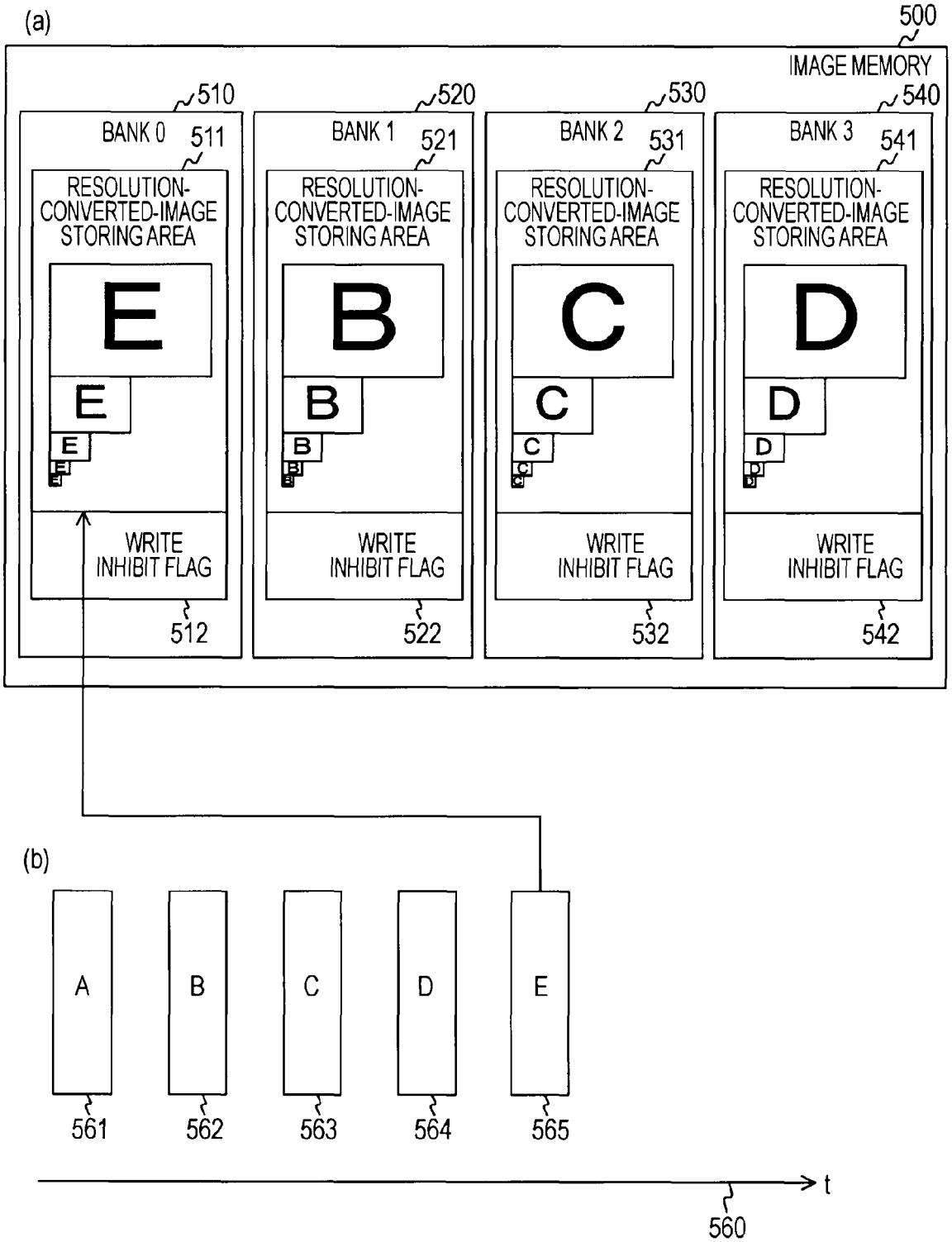
FIG. 9 is a diagram schematically showing a case in which Captured Images B through E outputted from the camera signal processing unit is stored into Bank 0 through Bank 3 according to an embodiment of the present invention.

FIG. 7 is a diagram schematically showing a storage method used for storing images whose resolutions have been converted by the resolution converting unit 130 into the image memory 500 according to an embodiment of the present invention. The example shown in FIG. 9 is directed to a case in which a plurality of images whose resolutions have been converted by the resolution converting unit 130 are stored into Bank 0(510) of the image memory 500. Since the same applies to Bank 1(520) through Bank 3(540) as in Bank 0(510), description thereof is omitted here.

Images 551 through 555 stored in the resolution-converted-image storing area 511 are images obtained by applying resolution conversion by the resolution converting unit 130 to an image captured in the same single frame, and their resolutions differ. That is, since the images 551 through 555 are obtained from an image captured in the same single frame, the images 551 through 555 represent a combination of images with different resolutions captured at the same single time point. For example, the image 551 is set as an image with the same resolution as that of a captured image outputted from the camera signal processing unit 123. Then, with the resolution of the image 551 as a reference, the images 552 through 555 can be set as images obtained by sequentially reducing the resolution by half. For example, if the resolution of the image 551 is 640 pixels×480 pixels, the resolution of the image 552 is set as 320 pixels×240 pixels, the resolution of the image 553 is set as 160 pixels×120 pixels, the resolution of the image 554 is set as 80 pixels×60 pixels, and the resolution of the image 555 is set as 40 pixels×30 pixels. In this way, in each of Bank 1(520) through Bank 3(540), a combination of a plurality of images with progressively lower resolutions are stored with respect to an image captured at the same single time point. Since the necessary resolution of an image differs for each process, an image with an appropriate resolution suited for each process can be used from among the combination of the plurality of images stored in each of Bank 1(520) through Bank 3(540).

Figure 8:
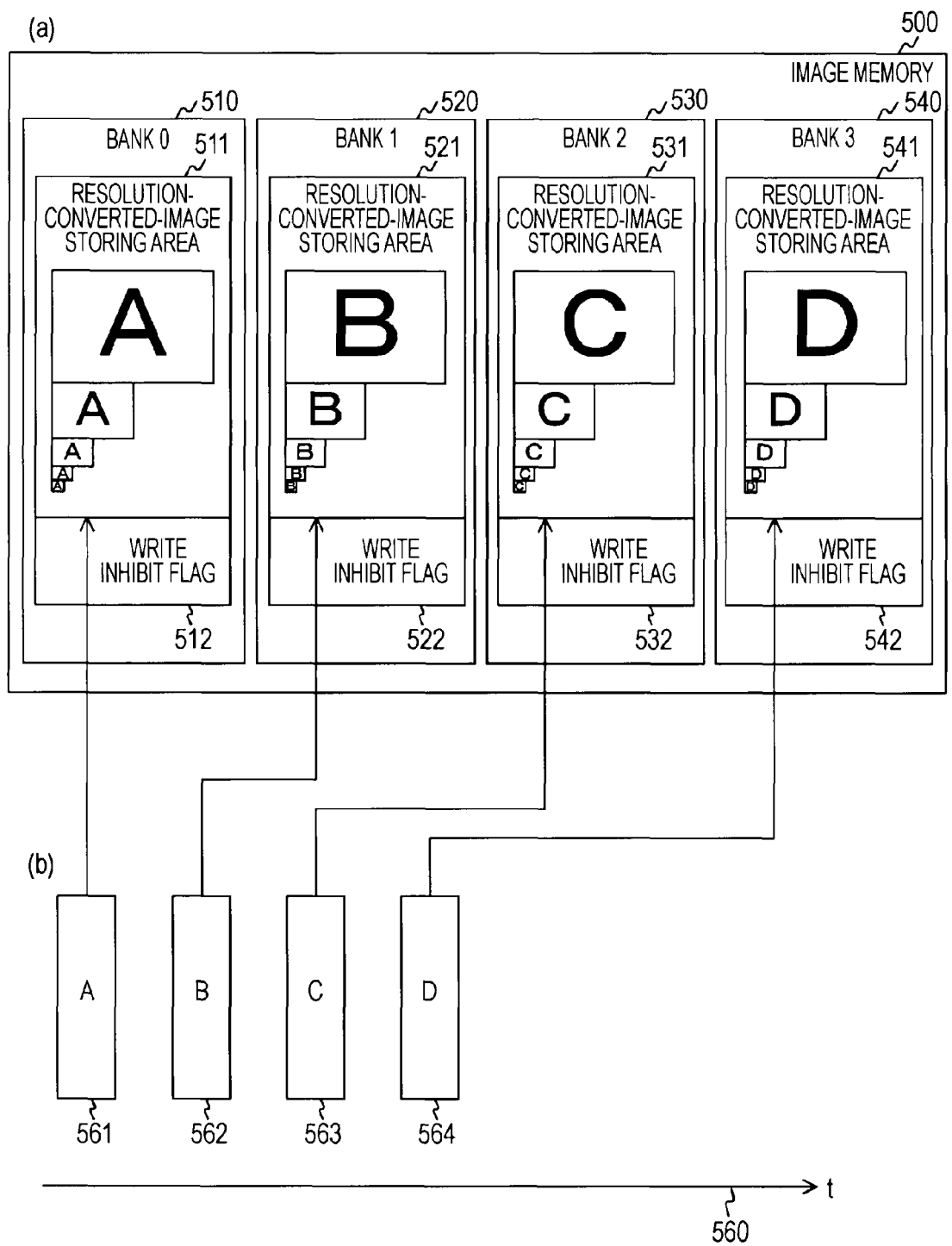
FIG. 8 is a diagram schematically showing a case in which Captured Images A through D outputted from a camera signal processing unit are stored into Bank 0 through Bank 3 according to an embodiment of the present invention.

FIG. 8 is a diagram schematically showing a case in which Captured Images A(561) through D(564) outputted from the camera signal processing unit 123 are stored into Bank 0(510) through Bank 3(540) according to an embodiment of the present invention. Captured images A (561) through D (564) are generated at a fixed frame rate. FIG. 8(*a*) schematically shows a state in which images obtained by applying resolution conversion to each of Captured Images A(561) through D(564) are stored in Bank 0(510) through Bank 3(540). FIG. 8(*b*) shows Captured Images A(561) through D(564) arranged in time series along the direction of an arrow 560. Symbols A, B, C, and D included in the respective images stored in Bank 0(510) through Bank 3(540) shown in FIG. 8(*a*) correspond to symbols A, B, C, and D included in Captured Images A(561) through D(564) shown in FIG. 8(*b*).

As shown in FIG. 8(*a*), with respect to Captured Images A(561) through D(564) generated at a fixed frame rate, writes are sequentially made to Bank 0(510) through Bank 3(540) on a frame-by-frame basis. In this case, for example, writing of resolution-converted images is done in the order of Bank 0(510), Bank 1(520), Bank 2(530), and Bank 3(540). As shown in FIG. 8(*a*), after writing of resolution-converted images to Bank 3(540) is done, as shown in FIG. 9(*a*), the processing returns to Bank 0(510), and writing of resolution-converted images is performed. That is, when the write inhibit flag for a bank to be written to is not ON, writes are made sequentially in a ring-like fashion in the order of Bank 0(510), Bank 1(520), Bank 2(530), Bank 3(540), Bank 0(510), and so on. The case when the write inhibit flag is ON will be described later in detail with reference to FIG. 11.

In this way, a combination of a plurality of images with different resolutions that are generated from an image at the same single time point are sequentially written as a set of images to each of Bank 0(510) through Bank 3(540). The writing of Captured Image E(565) generated after Captured Image D(564) will be described later in detail with reference to FIG. 9.

FIG. 9 is a diagram schematically showing a case in which Captured Images B(562) through E(565) outputted from the camera signal processing unit 123 are stored into Bank 0(510) through Bank 3(540) according to an embodiment of the present invention. Captured Images A(561) through D(564)

are the same as those shown in FIG. 8(b) and thus denoted by the same symbols, and description thereof is omitted here. As described above, Captured Images A(561) through E(565) are generated at a fixed frame rate. FIG. 9(a) schematically shows a state in which images obtained by applying resolution conversion to each of Captured Images B (562) through E (565) are stored in Bank 0(510) through Bank 3(540). FIG. 9(b) shows Captured Images A (561) through E (565) arranged in time series along the direction of the arrow 560.

As shown in FIG. 9(a), when images are respectively stored in Bank 0(510) through Bank 3(540), if the bank to which images are last written is Bank 3(540), a write is made to Bank 0(510). In this case, in Bank 0(510), images obtained by applying resolution conversion to Captured Image E(565) are written over the images obtained by applying resolution conversion to Captured Image A(561).

Figure 10:
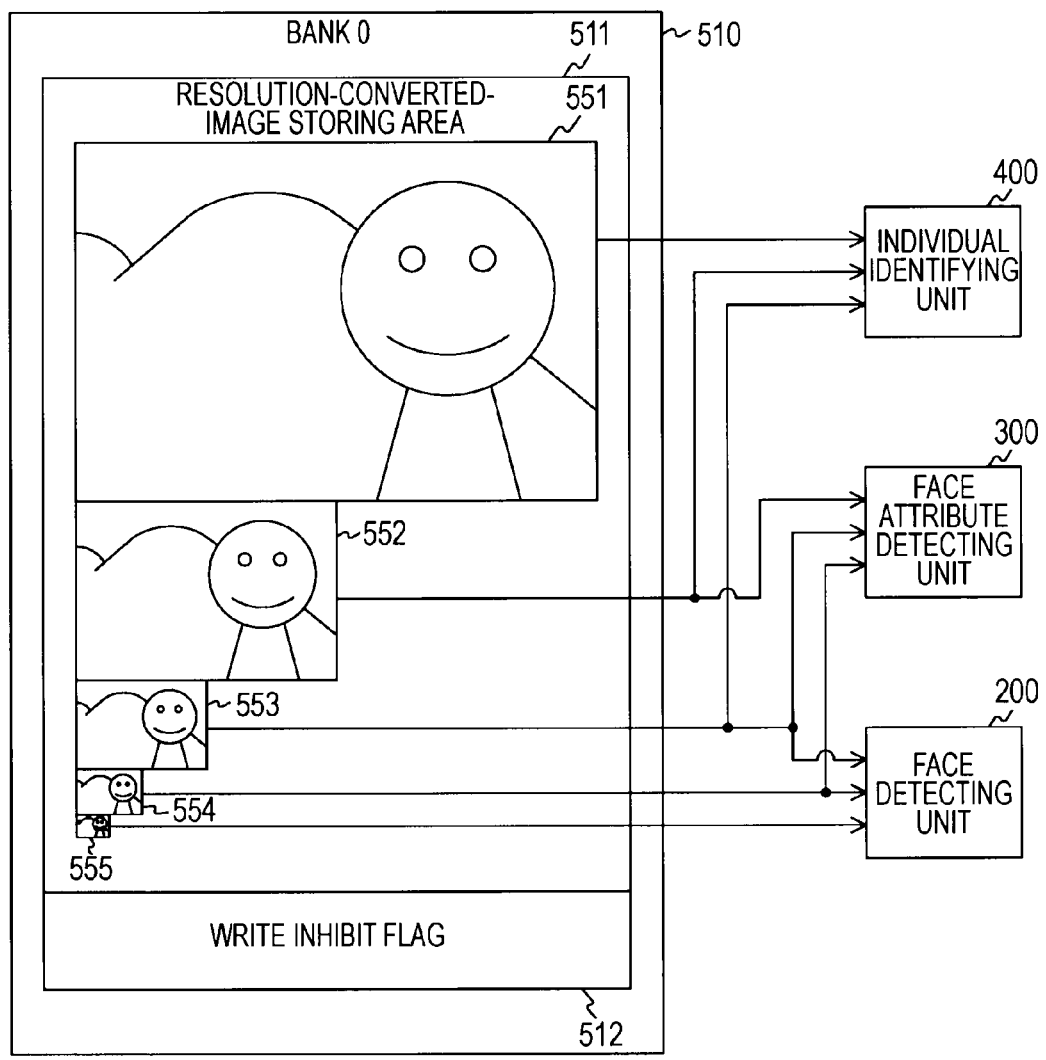
FIG. 10 is a diagram schematically showing an acquiring method of acquiring, from the image memory, images used in respective processes in the face detecting unit, the face attribute detecting unit, and the individual-identifying unit.

FIG. 10 is a diagram schematically showing an acquiring method of acquiring from the image memory 500 images used in the respective processes in the face detecting unit 200, the face attribute detecting unit 300, and the individual-identifying unit 400. The example shown in FIG. 10 is directed to a case in which images stored in Bank 0(511) of the image memory 500 are acquired by each of the face detecting unit 200, the face attribute detecting unit 300, and the individual-identifying unit 400. The images 551 through 555 stored in Bank 0(511) of the image memory 500 are the same as the images 551 through 555 shown in FIG. 7 and thus denoted by the same symbols, and description thereof is omitted here.

While human faces in varying sizes (areas or resolutions) exist in the images stored in Bank 0(511) of the image memory 500, the face size used for the face detection process (size of basic face data) is a fixed size as shown in FIG. 6C. Accordingly, to allow a correlation process with basic face data (dictionary) to be performed with respect to a face of any size, images in several levels of resolution are prepared as shown in FIG. 10. Then, an image stored in Bank 0(511) is selected so that the size of the face to be detected, and the face size in the corresponding image substantially match each other.

As described above, among the respective processes in the face detecting unit 200, the face attribute detecting unit 300, and the individual-identifying unit 400, in the face detection process, a human face can be recognized as a face even if the resolution of an image used for face detection is relatively low. Accordingly, when performing the face detection process, the face detection process is performed by using, for example, the images 553 through 555 among the set of images (images 551 through 555) stored in Bank 0(511) shown in FIG. 10. In this case, if the face size falls between those in the image 553 and the image 554, the image 553 may be converted in resolution (reduced in size) into a resolution between those of the image 553 and the image 554 so that the two sizes match. Alternatively, for example, the face detecting unit 200 can sequentially convert the resolution of the image 553 into resolutions in 10 levels for use. This makes it possible to further improve the accuracy of face detection.

In this connection, as shown in FIG. 6C, since the face size used in the face detection process is relatively small and has a low resolution, faces detected by the face detection processes using the images 551 and 552 are often relatively small in size and low in resolution. In the case of such an image that is relatively small in size and low in resolution, there is a fear that even through a face can be detected, it may be difficult to perform face attribute detection and individual identification. Accordingly, in the face detection process, for example, among the set of images (images 551 through 555) stored in Bank 0(511) shown in FIG. 10, the images 551 and 552 are not used. This makes it possible to increase the processing speed for the face detection process, the face attribute detection process, and the individual-identifying process.

In the face attribute detection process, it is often difficult to detect the facial expression, age range, or sex unless the resolution is somewhat higher than that used in the face detection process. Accordingly, when performing the face attribute detection process, the face attribute detection process is performed by using, for example, the images 552 through 554 among the set of images (images 551 through 555) stored in Bank 0(511) shown in FIG. 10.

Further, in the individual-identifying process, it is often difficult to identify a specific individual unless the resolution is higher than that used in the face attribute detection process. Accordingly, when performing the individual-identifying process, the individual-identifying process is performed by using, for example, the images 551 through 553 among the set of images (images 551 through 555) stored in Bank 0(511) shown in FIG. 10. It should be noted that in the face attribute detection process and the individual-identifying process, as in the face detection process, an image acquired from Bank 0(511) can be sequentially converted into resolutions in a plurality of levels for use. This makes it possible to achieve a further improvement in the accuracy of face attribute detection and individual identification.

In this way, for each of the face detection process, the face attribute detection process, and the individual-identifying process, an image with an optimum resolution for each process can be selected for use from among a set of shared images (for example, the images 551 through 555). This makes it possible to increase the processing speed for the face detection process, the face attribute detection process, and the individual-identifying process.

Next, a case where writes to and reads from Bank 0(510) through Bank 3(540) are made in the image memory 500 will be described in detail with reference to the drawings.

Figure 11:
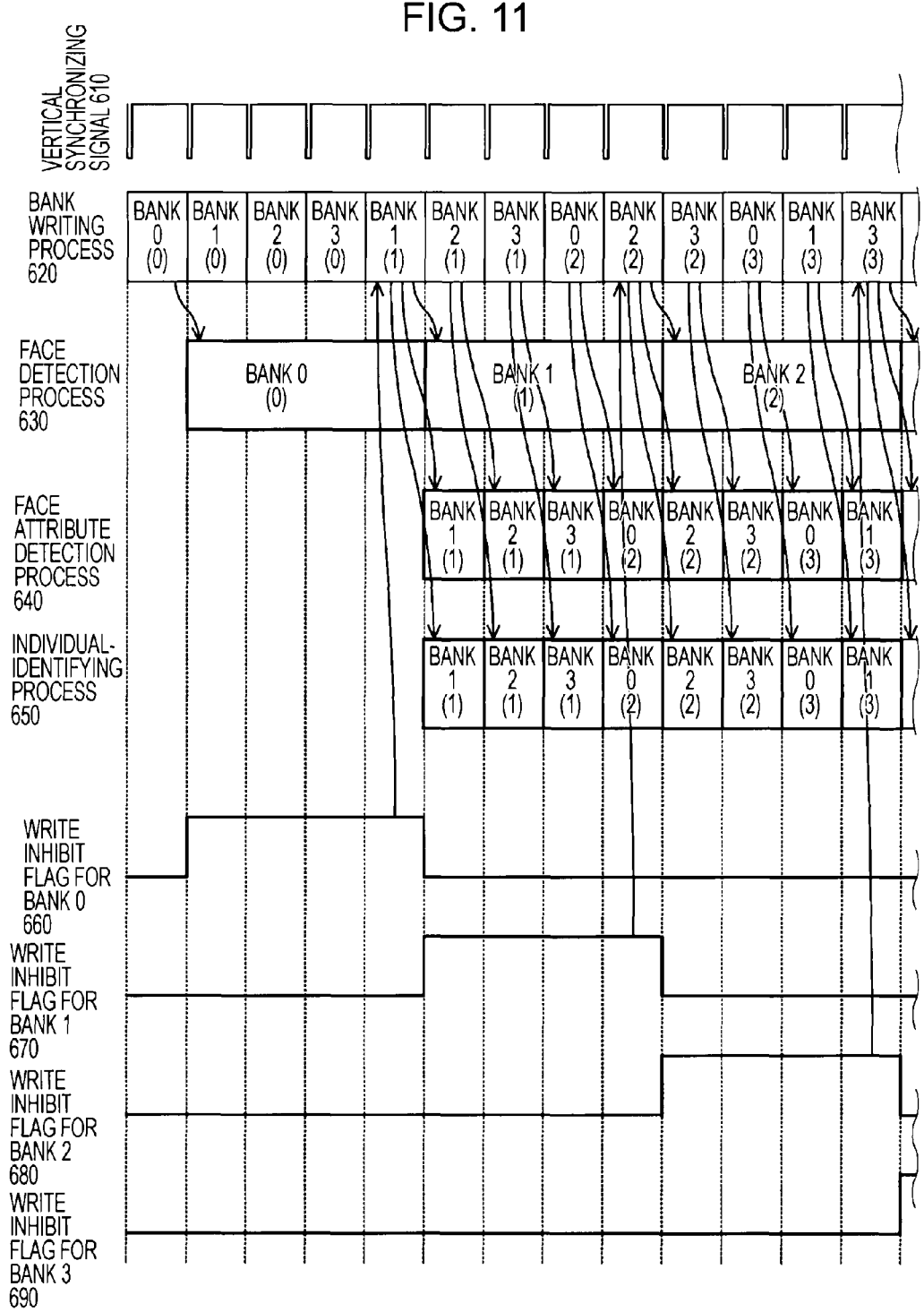
FIG. 11 is a timing chart illustrating bank writing processes in individual banks of the image memory, and a face detection process, a face attribute detection process, and an individual-identifying process that are performed by using the banks according to an embodiment of the present invention.

FIG. 11 is a timing chart illustrating bank writing processes in individual banks of the image memory 500, and a face detection process, a face attribute detection process, and an individual-identifying process that are performed by using the banks according to an embodiment of the present invention.

Now, a description will be given of the number of banks necessary when performing each of the face detection process, the face attribute detection process, and the individual-identifying process. For example, when different banks are used respectively in the face detection process, the face attribute detection process, and the individual-identifying process, at least three banks are necessary for reads in the respective processes. That is, since it is not possible for the three processes to read from a single bank concurrently, at least three banks are necessary for reads in the respective processes. Also, other than the banks being used for reads, at least one bank is necessary for writes. Thus, when the face detection process, the face attribute detection process, and the individual-identifying process use different banks, at least four banks are necessary.

In a case where the three processes can read from a single bank concurrently, at least one bank is necessary for reads in the respective processes. However, although described later in detail, generally a processing time of as much as several frames is necessary for a face detection process, whereas for the face attribute detection process and the individual-identifying process, there is a high possibility of being able to finish the processes within one frame. Thus, to sequentially perform the face attribute detection process and the individual-identifying process for individual frames, other than the bank being used for reads in the face detection process that takes a processing time of as much as several frames, at least one bank is necessary for reads in the face attribute detection process and the individual-identifying process. That is, in a case where the three processes can read from a single bank concurrently, at least two banks are necessary for reads in the face detection process, and the face attribute detection process and the individual-identifying process. In addition, other than these banks being used for reads, at least one bank is necessary for writes. Thus, in a case where the three processes can read from a single bank concurrently, at least three banks are necessary. In the embodiment of the present invention, the description is directed to a case in which the three processes can read from a single bank concurrently. Also, the example shown in FIG. 11 is directed to a case in which four banks are provided in the image memory 500.

The example shown in FIG. 11 is directed to a case in which processing is performed by writing resolution-converted images outputted from the resolution converting unit 130 to individual banks in a bank writing process 620, and the images written to the individual banks in the bank writing process 620 are read in each of processes 630, 640, and 650. In the bank writing process 620, write target banks are depicted as being arranged in time series, and the write cycle is shown in brackets. The bank names and periods shown in the face detection process 630, the face attribute detection process 640, and the individual-identifying process 650 correspond to the bank names and periods shown in the bank writing process 620. Write inhibit flags 660, 670, 680, and 690 for the individual banks show ON or OFF set for the respective flags.

For example, in the face detection process 630, a set of images stored in the bank last written to among Banks 0(511) through 3(514) are read, and a face detection process is performed by using images included in this set of images. That is, a face detection process is performed by using a bank in which images related to the latest one frame are stored, among banks that are updated every fixed time interval in accordance with the frame rate.

In the face detection process 630, to detect faces of various sizes (areas) from among images to be processed, it is necessary to run a search repeatedly across the entire screen. Thus, generally a processing time of as much as several frames (for example, four frames) is necessary. Since a processing time of as much as several frames is thus necessary for the face detection process 630, during this face detection process, overwrites are inhibited for a bank that is being subject to the face detection process. That is, for each bank that is being subject to a face detection process, a write inhibit flag is set ON, as indicated by write inhibit flags 660 through 690 for Banks 0 through 3 respectively. For example, when processing using Bank 0(0) is being performed in the face detection process 630, as indicated by the write inhibit flag 660 for Bank 0, the write inhibit flat for Bank 0(511) is set ON. The length of such processing time also varies in accordance with the search parameter settings. In this way, while captured images that have undergone resolution conversion are written to all the banks on a frame-by-frame basis, since the face detection process 630 is often slower than the bank writing rate (bank updating rate), one image is used for the face detecting process 630 every several frames.

The face attribute detection process 640 and the individual-identifying process 650 may be performed with respect to only a face region included in images stored in each bank, by using the processing results obtained by the face detection process 630. Thus, there is a high possibility that processing is finished faster than the update rate of the write process in each bank (that is, processing is finished within one frame). For this reason, during processing in the face attribute detection process 640 and the individual-identifying process 650, it is not necessary to inhibit overwrites to the bank being processed. Accordingly, the write inhibit flag for the bank being processed is set OFF even during processing in the face attribute detection process 640 and the individual-identifying process 650.

Comparing the face attribute detection process 640 and the individual-identifying process 650 with each other, the processing time tends to be relatively longer in the individual-identifying process 650 than in the face attribute detection process 640. This is because in the individual-identifying process 650, even in the case of identifying the same single person, there are many factors that hinder identification of an individual, such as the facial expression, hairstyle, the way light hits the person, the presence/absence and kind of eyeglasses, and changes in the face with elapse of time.

In the case where processing is finished within one frame as in the face attribute detection process 640 and the individual-identifying process 650, it is desirable that the target processing image be updated every frame, and thus each of the processes is performed by selecting images related to the latest one frame. That is, as shown in FIG. 11, each of the face attribute detection process 640 and the individual-identifying process 650 is performed by using images stored in the bank last written to.

In a case where each of the face attribute detection process 640 and the individual-identifying process 650 is to be performed with respect to images stored in Bank 1(1), the face detection process 630 performed with respect to Bank 0(0) represents the latest processing results. Thus, until the face detection process 630 is finished with respect to the next Bank 1(1), the face attribute detecting process 640 and the individual-identifying process 650 are performed using the processing results obtained with respect to Bank 0(0). Specifically, the processing results with respect to Bank 0(0) are used in the face attribute detecting process 640 and the individual-identifying process 650 that are performed with respect to each of images stored in Bank 1(1), Bank 2(1), Bank 3(1), and Bank 0(2).

In this case, a time difference can occur between images used in each of the face attribute detection process 640 and the individual-identifying process 650, and the face detection results used. Specifically, when performing the face attribute detection process 640 and the individual-identifying process 650 with respect to images stored in Bank 1(1), Bank 2(1), Bank 3(1), and Bank 0(2), a time difference occurs since these processes are performed using the processing results obtained with respect to Bank 0(0). Accordingly, by taking this time difference into consideration, when performing the face attribute detection process 640 and the individual-identifying process 650, the portion in the vicinity of a face is cut out in a somewhat large size from images stored in the bank to be processed, thus achieving high-accuracy correspondence between the images and the face detection results. For example, assuming that the position of a face is unlikely to move much within several frames in the case of an image captured at 30 to 60 frames per second, it can be said that even if the images used in the face attribute detection process 640 and the individual-identifying process 650 and the face detection results do not match in time, the influence of such a mismatch is small.

The control unit 110 grasps on the basis of images in which bank at what time point the result data of each of the face detection process, the face attribute detection process, and the individual-identifying process is outputted. Then, the results of the face detection process can be used for the face attribute detection process and the individual-identifying process that immediately follow, and the results of the face attribute detection process can be used for the individual-identifying process that immediately follows. This clarifies the temporal correspondence between the pieces of result data obtained by the respective processes, and makes it possible to obtain highly accurate result data.

Next, the bank writing process 620 will be described. As shown in FIG. 8 and FIG. 9, writes in the bank writing process 620 are basically done in a ring-like fashion in the order of Bank 0, Bank 1, Bank 2, Bank3, Bank 0, and so on.

In the face detection process 630, images written to Bank 0 for the 0th time (indicated as "Bank 0(0)" in FIG. 11) are read over four frames to perform the face detection process. Accordingly, in the section of "Bank 0(0)" in the face detection process 630, the write inhibit flag 660 for Bank 0 is set ON to inhibit overwriting of Bank 0. In this section, the next bank to be written to after Bank 3(0) is not Bank 0 but Bank 1 (indicated as "Bank 1(1)" in FIG. 11). Likewise, in the face detection process 630, in a section in which a face detection process using images stored in Bank 1(1) is performed, the write inhibit flag 670 for Bank 1 is set ON. Thus, in this section, the next bank to be written to after Bank 0(2) is not Bank 1 but Bank 2 (indicated as "Bank 2(2)" in FIG. 11). Thereafter, the bank writing process is performed in the same manner.

In FIG. 11, the relationships between individual processes and banks used in the individual processes are indicated by downwardly pointing arrows. In addition, the relationships between the write inhibit flags 660, 670, 680, and 690 corresponding to the respective banks, and the banks that are written to next on the basis of these flags are indicated by upwardly pointing arrows.

The example shown in FIG. 11 assumes a case in which the individual-identifying process 650 is executed once every one frame, and the face attribute detection process 640 is executed several times every one frame. Even if individual processes vary in processing time and there is a large difference between the update rates of images used in the individual processes as described above, as in the embodiment of the present invention, by using a plurality of shared banks, their read and write controls can be managed in association with each other. Thus, the volume of images to be processed in each process can be minimized, and the amount of access to the image memory 500 from each processing unit can be kept small. Also, by grasping the correspondence between images that are subject to processing in each of the face detection process 630, the face attribute detection process 640, and the individual-identifying process 650, and the corresponding result data, a high-accuracy detecting operation can be realized.

Next, operation of the image capturing device 100 according to an embodiment of the present invention will be described with reference to the drawings.

Figure 12:
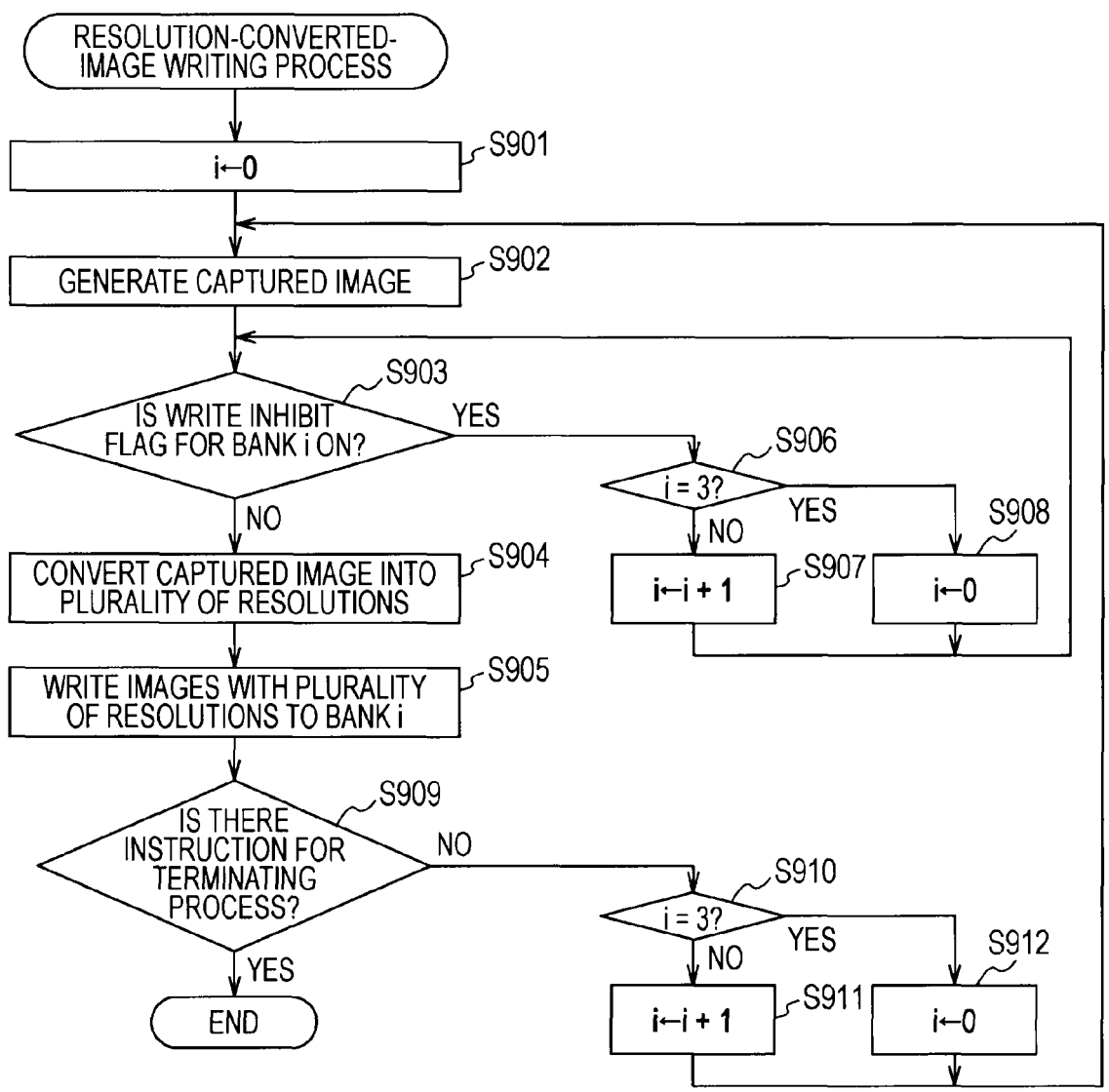
FIG. 12 is a flowchart showing the procedure of a resolution-converted-image writing process performed by the image capturing device according to an embodiment of the present invention.

FIG. 12 is a flowchart showing the procedure of a resolution-converted-image writing process performed by the image capturing device 100 according to an embodiment of the present invention. This example is directed to a case in which four banks, Banks 0(511) through 3(514), are provided in the image memory 500 and, as a rule, writes are sequentially done in a ring-like fashion. In this regard, writes are not made to a bank for which the write inhibit flag is set ON, and writes are made to the next bank (bank for which the write inhibit flag is set OFF) in the ring-like sequence.

First, a variable i is initialized to "0" (step S901). A captured image is generated by the camera signal processing unit 123 (step S902). Then, it is determined whether or not the write inhibit flag for Bank i is ON (step S903). If the write inhibit flag for Bank i is not ON (step S903), the resolution converting unit 130 converts the generated captured image into images with a plurality of different resolutions (step S904). Then, the converted images with a plurality of resolutions are written to Bank i as a set of images (step S905).

On the other hand, if the write inhibit flag for Bank i is ON (step S903), it is determined whether or not "i=3" (step S906). If "i=3" does not hold (step S906), "1" is added to the variable i (step S907), and the processing returns to step S903. On the other hand, if "i=3" (step S906), the variable i is initialized to "0" (step S908), and the processing returns to step S903. In this regard, among Banks 0(511) to 3(514), the write inhibit flag is ON for only one bank that is being used in the face detection process. Thus, by advancing the variable i to the next, the corresponding bank becomes a write-permitted bank without fail.

In addition, after the set of images are written to Bank i (step S905), it is determined whether or not an instruction to terminate the resolution-converted-image writing process has been issued (step S909). If an instruction to terminate the resolution-converted-image writing process has been issued (step S909), the operation of the resolution-converted-image writing process is terminated. If an instruction to terminate the resolution-converted-image writing process has not been issued (step S909), it is determined whether or not "i=3" (step S910). If "i=3" does not hold (step S910), "1" is added to the variable i (step S911), and the processing returns to step S902. On the other hand, if "i=3" (step S910), the variable i is initialized to "0" (step S912), and the processing returns to step S902.

While FIG. 12 is directed to the case in which four banks, Banks 0(511) through 3(514), are provided in the image memory 500, the number of banks may be increased or reduced in accordance with the parallel arrangement of banks respectively read by the face detection process, the face attribute detection process, and the individual-identifying process.

Figure 13:
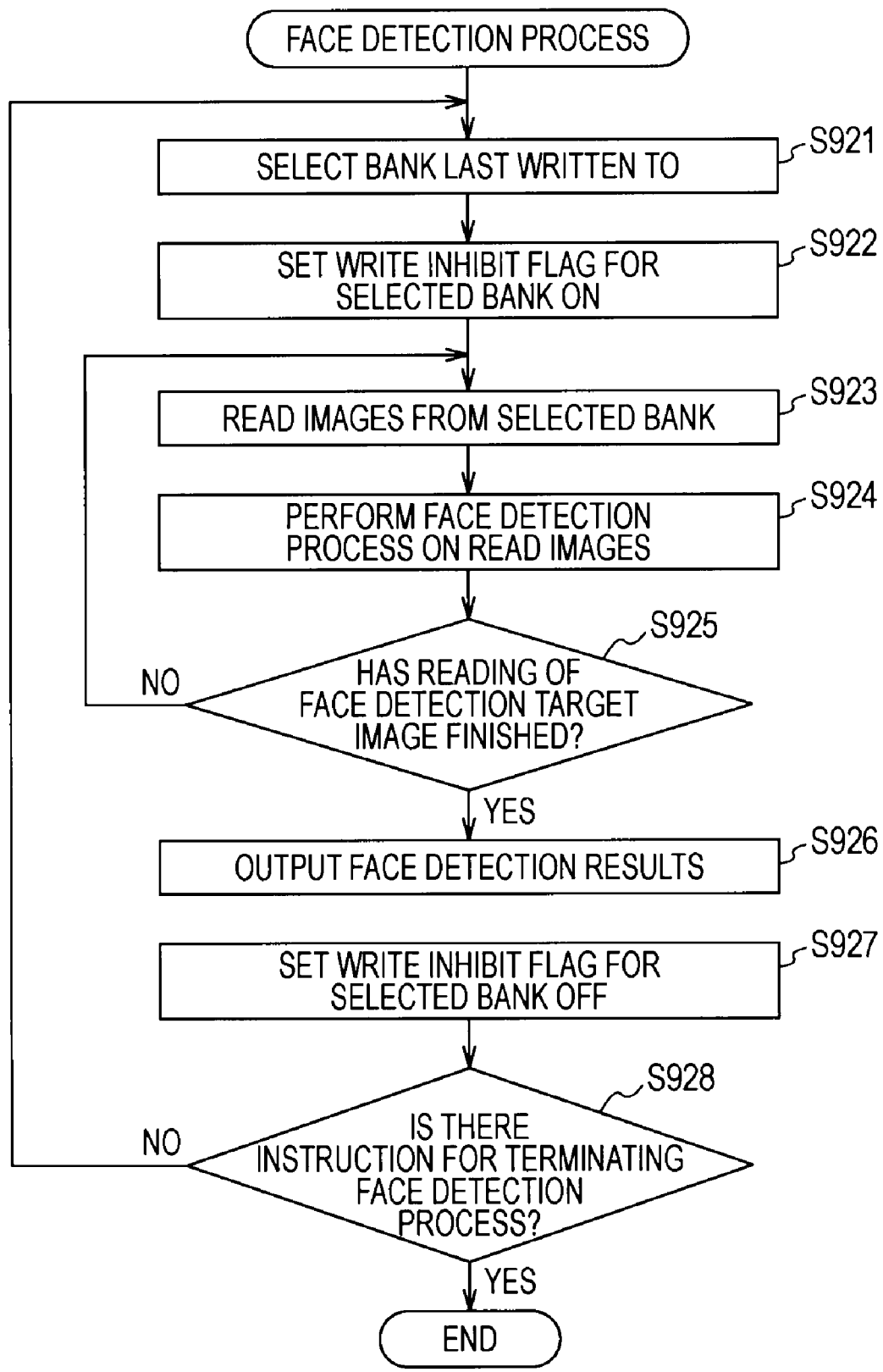
FIG. 13 is a flowchart showing the procedure of a face detection process performed by the image capturing device according to an embodiment of the present invention.

FIG. 13 is a flowchart showing the procedure of a face detection process performed by the image capturing device 100 according to an embodiment of the present invention. This example is directed to a case in which four banks, Banks 0(511) through 3(514), are provided in the image memory 500, and the write inhibit flag for a bank in which images subject to the face detection process are stored is set ON.

First, for images to be used for the face detection process, the bank last written to is selected (step S921). Then, the write inhibit flag for the selected bank is set ON (step S922). That is, the selected bank is set to a write-inhibited state. Then, images are read from the selected bank (step S923), and a face detection process is performed with respect to the read images (step S924). Then, it is determined whether or not the face detection process has been finished (step S925). If the face detection process has not been finished (step S925), the processing returns to step S923.

If the face detection process has been finished (step S925), the face detection results with respect to the images read from the selected bank are outputted to the control unit 110, the face attribute detecting unit 300, and the individual-identifying unit 400 (step S926). Then, the write inhibit flag for the selected bank is set OFF (step S927). That is, the selected bank is set to a write-permitted state.

Then, it is determined whether or not an instruction to terminate the face detection process has been issued (step S928). If an instruction to terminate the face detection process has been issued (step S928), the operation of the face detection process is terminated. If an instruction to terminate the face detection process has not been issued (step S928), the processing returns to step S921.

Figure 14:
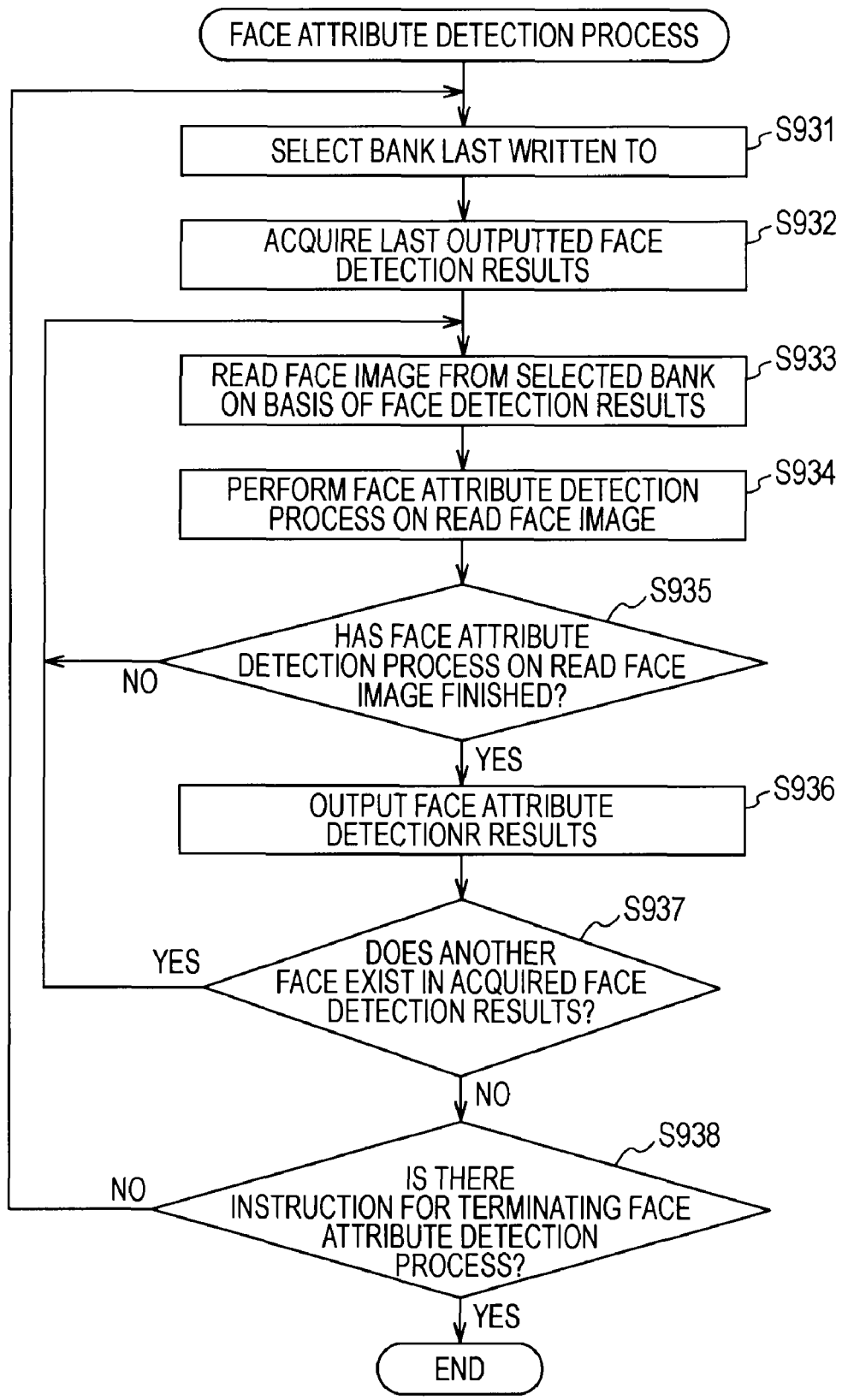
FIG. 14 is a flowchart showing the procedure of a face attribute detection process performed by the image capturing device according to an embodiment of the present invention.

FIG. 14 is a flowchart showing the procedure of a face attribute detection process performed by the image capturing device 100 according to an embodiment of the present invention. In this regard, while a processing time of several frames is necessary for the face detection process, the processing time necessary for the face attribute detection process is relatively short, so the face attribute detection process can be performed once or a plurality of times within one frame. Accordingly, FIG. 14 is directed to the case of a procedure that makes a round in one frame period.

First, as images to be used for the face attribute detection process, the bank last written to is selected (step S931). Then, the latest face detection results outputted from the face detecting unit 200 are acquired (step S932). In this regard, although the images stored in the selected bank and the images according to the acquired face detection results are not at the same time point (in the same frame), their combination is such that the time difference becomes minimum. For example, since the control unit 110 can manage how many frames worth of elapsed time there is from the face detection results to the images in the latest bank, slight time variations in face coordinates, face size, or face orientation within images can be taken into account.

Next, on the basis of the position (face coordinates) and size of a face contained in the acquired face detection results, a face region (face image) is cut out and read from images stored in the selected bank (step S933), and the face attribute detection process is performed with respect to the read face image (step S934). Then, it is determined whether or not the face attribute detection process has been finished (step S935). If the face attribute detection process has not been finished (step S935), the processing returns to step S933.

If the face attribute detection process has been finished (step S935), the face attribute detection results with respect to the read face image are outputted to the control unit 110, the face attribute detection result memory 301, and the individual-identifying unit 400 (step S936). Then, it is determined whether or not another face exists in the acquired face detection results (step S937). That is, it is determined whether or not a face other than the face for which the face attribute detection process has been finished exists. Then, the face attribute detection process is performed with respect to all of the faces contained in the acquired face detection results.

Then, it is determined whether or not an instruction to terminate the face attribute detection process has been issued (step S938). If an instruction to terminate the face attribute detection process has been issued (step S938), the operation of the face attribute detection process is terminated. If an instruction to terminate the face attribute detection process has not been issued (step S938), the processing returns to step S931. That is, if the face attribute detection process has been finished with respect to all of the faces contained in the acquired face detection results, the processing returns to step S931, and a break between frames is waited for.

Figure 15:
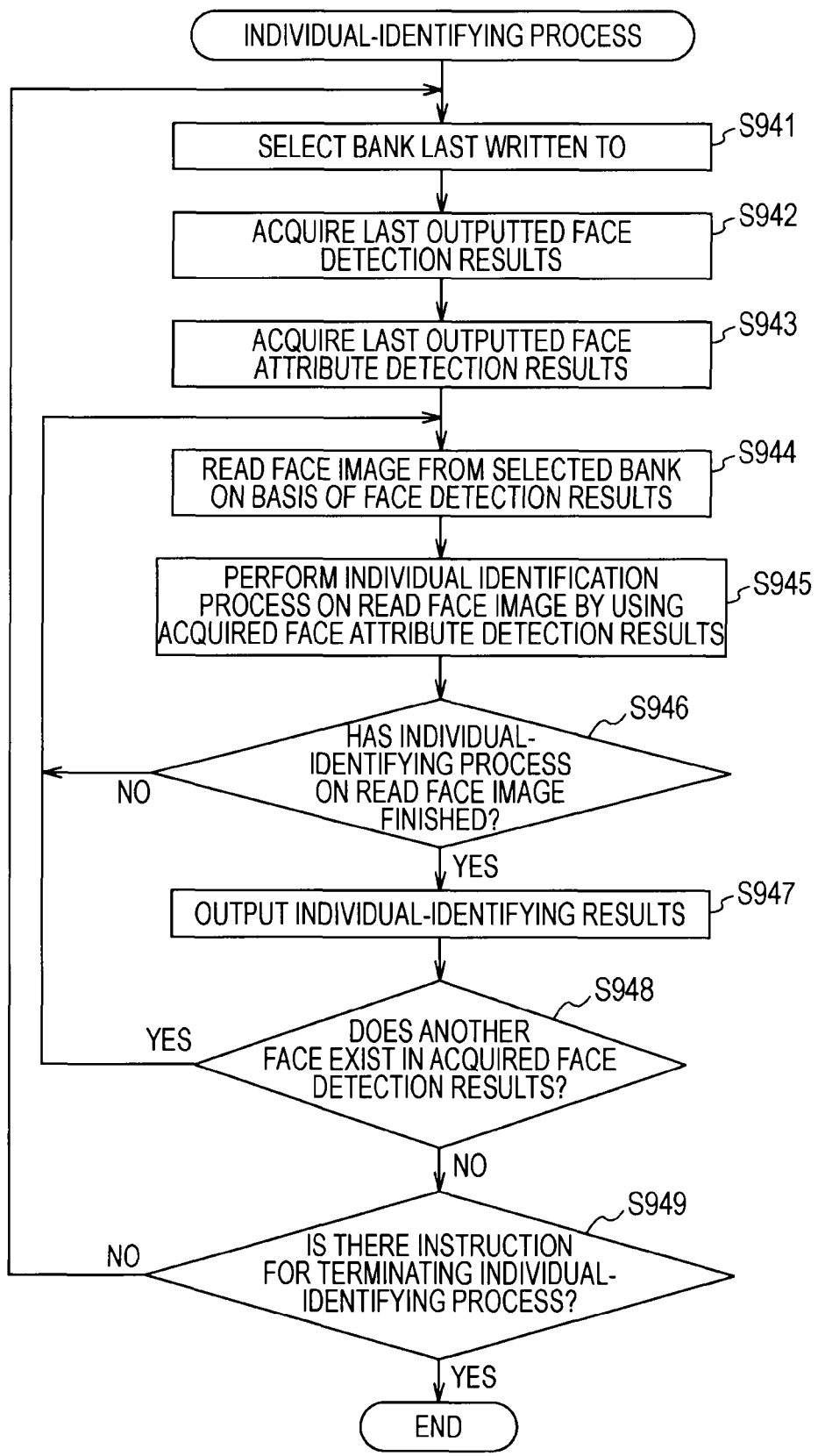
FIG. 15 is a flowchart showing the procedure of an individual-identifying process performed by the image capturing device according to an embodiment of the present invention.

FIG. 15 is a flowchart showing the procedure of an individual-identifying process performed by the image capturing device 100 according to an embodiment of the present invention. In this regard, while a processing time of several frames is necessary for the face detection process, the processing time necessary for the individual-identifying process is relatively short, so the individual-identifying process can be performed once or a plurality of times within one frame. Accordingly, FIG. 15 is directed to the case of a procedure that makes a round in one frame period.

First, as images to be used for the individual-identifying process, the bank last written to is selected (step S941). Then, the latest face detection results outputted from the face detecting unit 200 are acquired (step S942). In this regard, although the images stored in the selected bank and the images according to the acquired face detection results are not at the same time point (in the same frame), their combination is such that the time difference becomes minimum. For example, since the control unit 110 can manage how many frames worth of elapsed time there is from the face detection results to the images in the latest bank, slight time variations in face coordinates, face size, or face orientation within images can be taken into account.

Then, the latest face attribute detection results outputted from the face attribute detecting unit 300 are acquired (step S943). Then, on the basis of the position (face coordinates) and size of a face contained in the acquired face detection result, a face region (face image) is cut out and read from the images stored in the selected bank (step S944), and an individual-identifying process is performed with respect to the read face image by using the acquired face attribute detection results (step S945). In a case where a plurality of specific persons are registered in the face feature memory 401, if there are a plurality of faces contained in the acquired face detection result, similarity computation is repeatedly performed while varying their combination. Then, it is determined whether or not the individual-identifying process has been finished (step S946). If the individual-identifying process has not been finished (step S946), the processing returns to step S944.

If the individual-identifying process has been finished (step S946), the individual-identification results with respect to the read face image are outputted to the control unit 110 (step S947). Then, it is determined whether or not another face exists in the acquired face detection results (step S948). That is, it is determined whether or not a face other than the face for which the individual-identifying process has been finished exists. Then, the individual-identifying process is performed with respect to all of the faces contained in the acquired face detection results.

Then, it is determined whether or not an instruction to terminate the individual-identifying process has been issued (step S949). If an instruction to terminate the individual-identifying process has been issued (step S949), the operation of the individual-identifying process is terminated. If an instruction to terminate the individual-identifying process has not been issued (step S949), the processing returns to step S941. That is, if the individual-identifying process has been finished with respect to all of the faces contained in the acquired face detection results, the processing returns to step S941, and a break between frames is waited for.

While the foregoing is directed to an example in which four banks, Banks 0(511) through 3(514), are provided in the image memory 500, in the following, a description will be given of an example in which three banks, Bank 0(710) through Bank 2(730)), are provided in the image memory 500.

Figure 16A:
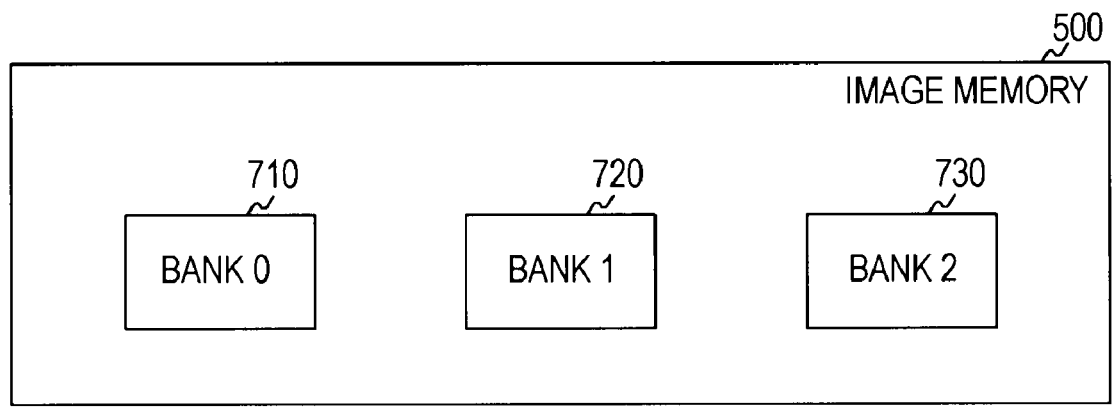
FIGS. 16A and 16B are diagrams schematically showing the contents of information stored in the image memory according to an embodiment of the present invention.
Figure 16B:
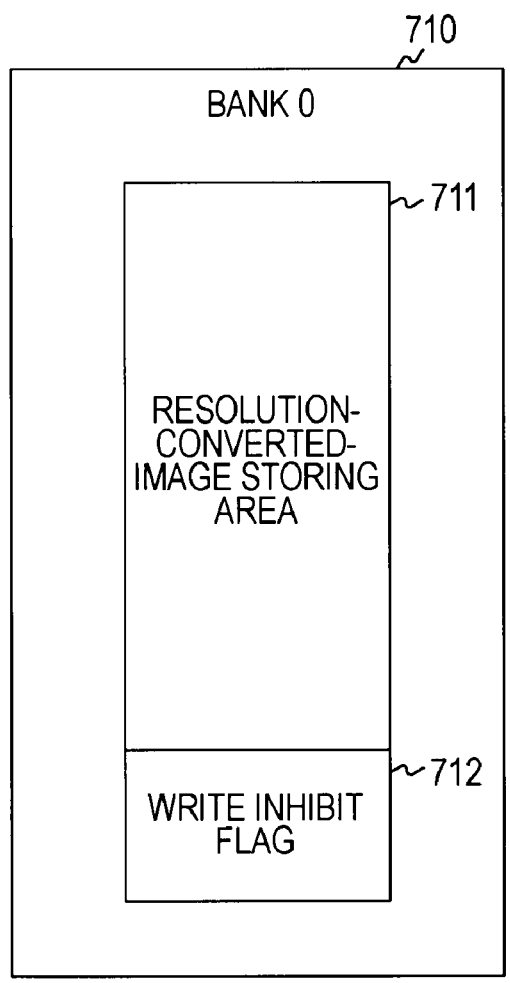

FIGS. 16A and 16B are diagrams schematically showing the contents of information stored in the image memory 500 according to an embodiment of the present invention. FIG. 16A shows Banks 0(710) through 2(730)) in the image memory 500, and FIG. 16B shows an example of the basic structure of Bank 0(710). Since the example shown in FIGS. 16A and 16B is the same as the example shown in FIGS. 5A and 5B except that the number of banks differs, detailed description thereof is omitted here.

Next, a case where writes to and reads from Bank 0(710) through Bank 2(730) are made in the image memory 500 will be described in detail with reference to the drawings.

Figure 17:
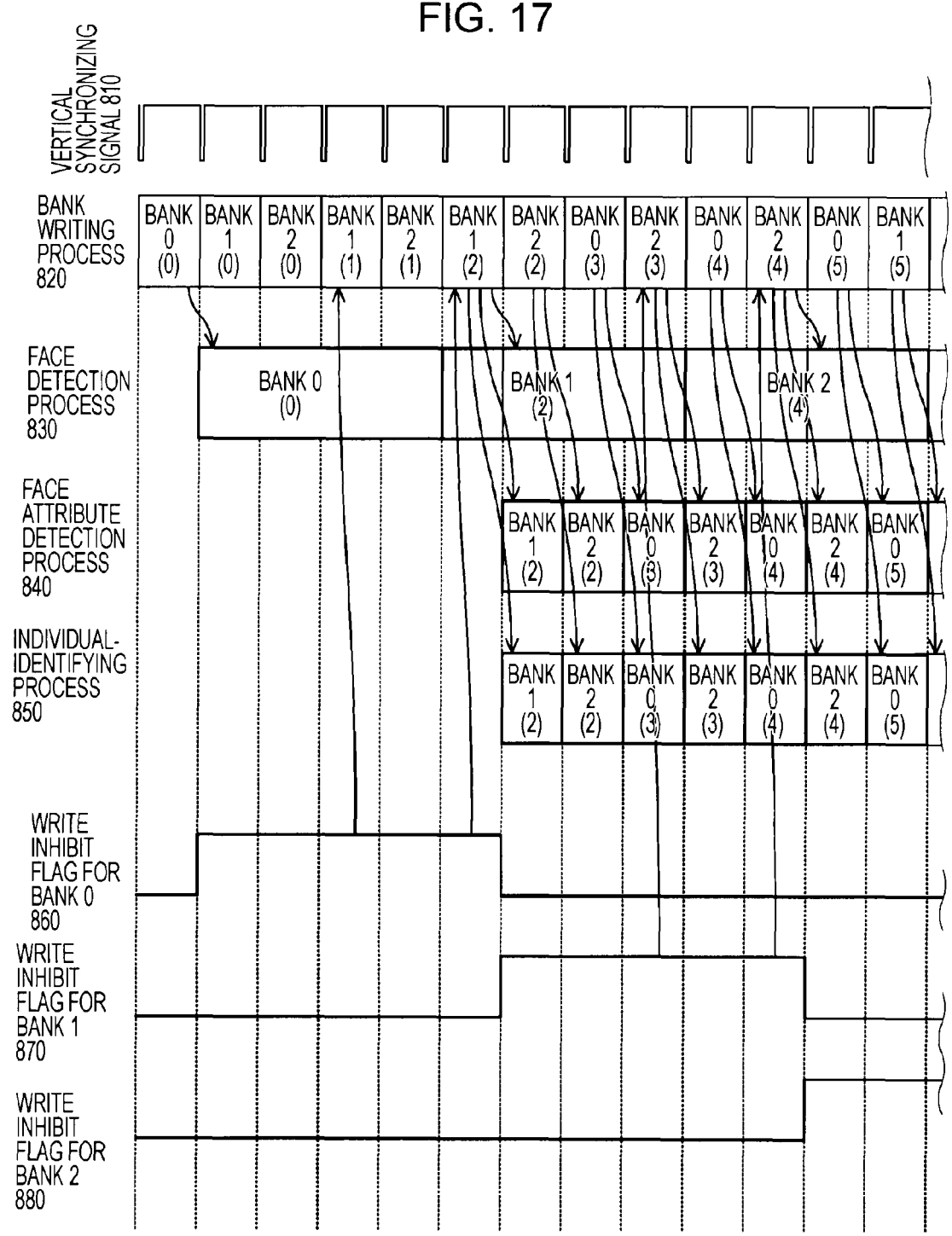
FIG. 17 is a timing chart illustrating bank writing processes in individual banks of the image memory, and a face detection process, a face attribute detection process, and an individual-identifying process that are performed by using the banks according to an embodiment of the present invention.

FIG. 17 is a timing chart illustrating bank writing processes in individual banks of the image memory 500, and a face detection process, a face attribute detection process, and an individual-identifying process that are performed by using the banks according to an embodiment of the present invention. The example shown in FIG. 17 is the same as the example shown in FIG. 11, except that the processing time of a face detection process 830 is longer and that the number of banks is reduced. Thus, the description will mainly focus on differences from the example shown in FIG. 11, and a detailed description of other points is omitted here.

FIG. 17 shows a case in which five frames are necessary as the processing time of the face detection process 830. Also, during the face detection process, overwrites are inhibited with respect to a bank that is being subject to the face detection process. Therefore, the two banks other than the bank being subject to the face detection process are a bank that is subject to a face attribute detection process 840 and an individual-identifying process 850, and a bank that is subject to a write process. In this way, also by providing three banks in the image memory 500, missing frames can be prevented. Even in a case where the processing time in the face detection process extends over five frames as in this case, images in a limited number of banks can be shared with the face attribute detection process and the individual-identifying process. While FIGS. 11 and 17 are directed to the case in which images used in the face detection process, and images used in the face attribute detection process and the individual-identifying process are images at different time points, images at the same time point as the images used in the face detection process may be used in the face attribute detection process and the individual-identifying process.

As described above, according to the embodiment of the present invention, images used for the face detection process, the face attribute detection process, and the individual-identifying process can be shared. Thus, images at cycles and resolutions optimal for individual processes can be used at optimal update rates.

In addition, since overwrites can be avoided even with respect to images in a shared bank while each process is performed, even a process that extends over several frames can be performed.

Since images for banks can be written to the image memory 500 every frame while avoiding overwrites to images being processed, missing frames can be prevented. In addition, since it is not necessary to store images in banks for each intended application, the write addresses of images in banks are limited to a unique set of addresses, and it is not necessary to write the same image to a plurality of addresses.

In addition, by sharing images used in individual processes, the storage volume of images on the image memory 500 can be reduced, and the amount of access to the memory bus 190 can be minimized. This allows for reduced power consumption and faster processing.

In addition, it is possible to clarify the association between result data obtained by each of the face detection process, the face attribute detection process, and the individual-identifying process, and a captured image (its generated time) from which the result data is obtained.

In addition, by using the face detection results for the face attribute detection process and the individual-identifying process, and using the face attribute detection results for the individual-identifying process, the accuracy and speed of each process can be further increased.

In addition, by managing images in a plurality of banks, it is possible to write to (update) another bank while reading from a given bank. Thus, a write access (image update) can be made in an optimal cycle for each process. Also, the latest frame can be read and used at all times while avoiding crossing of read and write addresses.

In addition, by using the latest frame at all times, even in the case of a moving image with subject motions or camera motions, a sufficiently high trackability can be maintained with respect to a human face. This makes it possible to enhance the real-time property with respect to the results of the face attribute detection process and individual-identifying process.

In addition, also in cases such as when the result data of each process is superimposed on the display image for use in a user interface, or when the result data of each process is used for various kinds of camera control such as the AF, AE, AWB, strobe control, auto-zoom, and skin color correction, the time difference of the result data from the captured image can be minimized. This makes it possible to achieve improved response and trackability.

While the above-described embodiment of the present invention is directed to the case in which the object is the face of a person, the embodiment of the present invention can be applied to cases in which the object is another animal such as a dog or a cat, a car, or the like. Also, while the above-mentioned embodiment of the present invention is directed to the case in which a face detection process or the like is performed as an image analysis process, the embodiment of the present invention can be applied to an image processing device that performs a plurality of other analysis processes on an image. In this case, if the processing time of another analysis process exceeds one frame, the write inhibit flag for the bank being used for that process is set ON.

While the above-mentioned embodiment of the present invention is directed to the image capturing device including an image capturing unit (the image sensor 122 and the camera signal processing unit 123) that generates a captured image, the embodiment of the present invention can be applied to an image processing device that does not include an image capturing unit. For example, the embodiment of the present invention can be applied to cases in which an image is inputted to an image processing device including an input terminal or a recording-medium mounting unit from the input terminal or a recording medium, and image analysis processes such as the face detection process, the face attribute detection process, and the individual-identifying process are performed on the inputted image.

In addition, the embodiment of the present invention can be applied to a camcorder (camera and recorder) that captures still and moving images, or various kinds of image capturing device in mobile telephones including an image capturing function.

It should be noted that the above-mentioned embodiment of the present invention represents only an example of implementing the present invention, and although the embodiment has correspondence to each of the invention-specifying matters in the claims as described above, the present invention is not limited to this, and various modifications are possible without departing from the scope of the present invention.

It should be noted that the process steps described with reference to the embodiment of the present invention may be grasped as a method including a series of these steps, or as a program for causing a computer to execute the series of these steps or a recording medium storing the program. As this recording medium, a recording medium such as a CD (Compact Disc), an MD (MiniDisc), a DVD (Digital Versatile Disk), a memory card, or a Blur-ray Disc (R) can be used.

The present application contains subject matter related to that disclosed in Japanese Priority Patent Application JP 2008-101947 filed in the Japan Patent Office on Apr. 9, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing device comprising:
   an image capturing unit that captures a subject and generates a captured image;
   a resolution converting unit that converts the captured image into a plurality of images with different resolutions;
   an image storing unit that stores the converted plurality of images with different resolutions as a set of images;
   a first image analysis processing unit that performs a first image analysis process that is a process of analyzing the captured image to determine whether the captured image includes a face by using a first combination of a first plurality of images among the images included in the set of images; and
   a second image analysis processing unit that performs a second image analysis process different from the first image analysis process, the second image analysis process being a process of analyzing the captured image to determine a physical attribute of the same face detected by the first image analysis processing unit by using, among the images included in the set of images, a second combination of a second plurality of images different from the first combination of the first plurality of images.

2. The image capturing device according to claim 1, wherein:
   the image capturing unit sequentially generates the captured image at a predetermined frame rate;
   the image storing unit includes a plurality of banks that serve as units in which the set of images are written or read;
   the image capturing device further comprises a control unit that performs a control of sequentially writing the set of images to each of the plurality of banks with respect to each the captured image;
   the first image analysis processing unit performs the first image analysis process by using images included in a set of images that is stored in, among the plurality of banks, a bank that is written to immediately before starting the first image analysis process with respect to each the captured image; and
   the second image analysis processing unit performs the second image analysis process by using images included in a set of images that is stored in, among the plurality of banks, a bank that is written to immediately before starting the second image analysis process with respect to each the captured image.

3. The image capturing device according to claim 2, wherein:
   the image storing unit includes, for each of the banks, a write inhibit flag for setting write inhibition to the bank;
   the first image analysis processing unit sets write inhibition in the write inhibit flag corresponding to the bank in which the images being used for the first image analysis process are stored; and
   the control unit performs a control of sequentially writing the set of images to each of the plurality of banks in accordance with a predetermined sequence with respect to each the captured image, and if write inhibition is set in the write inhibit flag corresponding to the bank to be written to, the control unit performs a control of writing the set of images to the next bank in the predetermined sequence that follows the bank to be written to.

4. The image capturing device according to claim 1, wherein at least one of images used in the face detection process is an image that is lower in resolution than images used in the face attribute detection process.

5. The image capturing device according to claim 1, further comprising:
   a specific-face identifying unit that performs a specific-face identifying process of identifying whether or not the detected face is a specific face by using, among the images included in the set of images, a combination of a plurality of images which is different from the first combination of images used in the face detection process and the second combination of images used in the face attribute detection process,
   wherein at least one of the images used in the face attribute detection process is an image that is lower in resolution than the images used in the specific-face identifying process.

6. The image capturing device according to claim 1, wherein:
   the first image analysis processing unit performs as the first image analysis process the face detection process of detecting the face contained in the captured image; and
   the second image analysis processing unit performs as the second image analysis process a specific-face identifying process of identifying whether or not the detected face is a specific face.

7. The image capturing device according to claim 1, wherein the first image analysis processing unit further determines whether the captured image includes a plurality of faces, and the second image analysis processing unit determines a physical attribute of each of the plurality of faces detected by the first image analysis processing unit.

8. The image capturing device according to claim 1, wherein the first image analysis processing unit determines a position of the face, a size of the face, and an orientation or angle of the face within the captured image.

9. The image capturing device according to claim 1, wherein the physical attribute of the face detected by the second image analysis processing unit includes at least one of a facial expression, age, sex, opening/closing of eyes, race, presence/absence of eyeglasses, presence/absence of a beard, presence/absence of a hat, hairstyle, orientation of angle of the face, and positions of eyes, mouth, eyebrows, and nose of the face.

10. The image capturing device according to claim 1, further comprising:
    a normalization unit that normalizes a size and tilt of the face detected by the first image analysis processing unit so that both eyes of the face are kept substantially horizontal and the face becomes a fixed size.

11. An image processing device comprising:
    an image input unit that inputs an image;
    a resolution converting unit that converts the inputted image into a plurality of images with different resolutions;
    an image storing unit that stores the converted plurality of images with different resolutions as a set of images;

a first image analysis processing unit that performs a first image analysis process of analyzing the inputted image to determine whether the inputted image includes a face by using a first combination of a first plurality of images among the images included in the set of images; and a second image analysis processing unit that performs a second image analysis process different from the first image analysis process, the second image analysis process being a process of analyzing the inputted image to determine a physical attribute of the same face detected by the first image analysis processing unit by using, among the images included in the set of images, a second combination of a second plurality of images different from the first combination of the first plurality of images.

12. An image analysis method for an image capturing device, comprising:

capturing a subject and generating a captured image;

converting the captured image into a plurality of images with different resolutions;

storing the converted plurality of images with different resolutions as a set of images into an image storing unit;

performing a first image analysis process that is a process of analyzing the captured image to determine whether the captured image includes a face by using a first combination of a first plurality of images among the images included in the set of images; and performing a second image analysis process different from the first image analysis process, the second image analysis process being a process of analyzing the captured image to determine a physical attribute of the same face detected by the first image analysis process by using, among the images included in the set of images, a second combination of a second plurality of images different from the first combination of the first plurality of images.

13. A non-transitory computer readable storage medium having store thereon a program which when executed by a computer causes the computer to perform a method comprising:

capturing a subject and generating a captured image;

converting the captured image into a plurality of images with different resolutions;

storing the converted plurality of images with different resolutions as a set of images into an image storing unit;

performing a first image analysis process that is a process of analyzing the captured image to determine whether the captured image includes a face by using a first combination of a first plurality of images among the images included in the set of images; and performing a second image analysis process different from the first image analysis process, the second image analysis process being a process of analyzing the captured image to determine a physical attribute of the same face detected by the first image analysis process by using, among the images included in the set of images, a second combination of a second plurality of images different from the first combination of the first plurality of images.

* * * * *